(12) United States Patent
Endo et al.

(10) Patent No.: US 10,481,812 B2
(45) Date of Patent: Nov. 19, 2019

(54) STORAGE DEVICE AND INFORMATION PROCESSING SYSTEM

(71) Applicant: Toshiba Memory Corporation, Tokyo (JP)

(72) Inventors: Shigeto Endo, Kamakura Kanagawa (JP); Michio Ido, Yokohama Kanagawa (JP); Keisuke Sato, Yokohama Kanagawa (JP); Masaomi Teranishi, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 63 days.

(21) Appl. No.: 15/439,880

(22) Filed: Feb. 22, 2017

(65) Prior Publication Data

US 2018/0052628 A1 Feb. 22, 2018

(30) Foreign Application Priority Data

Aug. 19, 2016 (JP) .................................. 2016-161199

(51) Int. Cl.
*G06F 12/00* (2006.01)
*G06F 13/00* (2006.01)
*G06F 3/06* (2006.01)
*G06F 21/79* (2013.01)
*G06F 21/85* (2013.01)

(52) U.S. Cl.
CPC ............ *G06F 3/0625* (2013.01); *G06F 3/061* (2013.01); *G06F 3/0634* (2013.01); *G06F 3/0655* (2013.01); *G06F 3/0688* (2013.01); *G06F 21/79* (2013.01); *G06F 21/85* (2013.01)

(58) Field of Classification Search
CPC .... G06F 3/0625; G06F 3/0688; G06F 3/0634; G06F 3/061; G06F 3/0655
USPC ......................................................... 711/103
See application file for complete search history.

(56) References Cited

U.S. PATENT DOCUMENTS

| 8,832,796 B2 * | 9/2014 | Miyake ............... G06F 21/6218 370/338 |
| 2003/0225766 A1 * | 12/2003 | Furumoto ........... G06F 21/6218 |
| 2004/0029536 A1 * | 2/2004 | Hamatsu ................. G06F 21/10 455/95 |

(Continued)

FOREIGN PATENT DOCUMENTS

JP 2004-185531 A 7/2004

*Primary Examiner* — Sheng Jen Tsai
(74) *Attorney, Agent, or Firm* — Kim & Stewart LLP

(57) ABSTRACT

A storage device includes a connection unit to which a first external device is to be connected, a first non-volatile memory in which content items are stored with associated content IDs, a first controller configured to access the content items stored in the first non-volatile memory, an antenna, a second non-volatile memory in which permission information is stored, and a second controller configured to update the permission information based on update information received from a second external device through the antenna. The update information is contained in radio waves transmitted by the second external device and the radio waves cause the antenna to generate power necessary to operate the second non-volatile memory and the second controller. In response to a read command from the first external device, the first controller performs a read of one of the content items based on the updated permission information.

10 Claims, 14 Drawing Sheets

(56) References Cited

U.S. PATENT DOCUMENTS

| | | | | |
|---|---|---|---|---|
| 2004/0052379 A1* | 3/2004 | Nishimoto | ............ | H04N 7/1675 380/281 |
| 2005/0131910 A1* | 6/2005 | Yanagisawa | ............ | G06Q 30/06 |
| 2007/0049343 A1* | 3/2007 | Fukasawa | ................ | H04L 29/06 455/558 |
| 2007/0124603 A1* | 5/2007 | Yamamichi | ............. | G06F 21/10 713/194 |
| 2007/0280186 A1* | 12/2007 | Kaneko | ................ | H04L 63/105 370/338 |
| 2008/0201770 A1* | 8/2008 | Okamoto | ................ | G06F 21/31 726/7 |
| 2009/0076912 A1* | 3/2009 | Rajan | .................... | G06Q 30/02 705/14.64 |
| 2010/0197236 A1* | 8/2010 | Kawamura | ....... | H04L 29/12028 455/67.7 |
| 2010/0325695 A1* | 12/2010 | Suzuki | .................... | G06F 21/10 726/3 |
| 2012/0173670 A1* | 7/2012 | Shinada | ................ | G06F 21/604 709/217 |
| 2012/0215882 A1* | 8/2012 | Goto | ................... | H04L 12/2812 709/217 |
| 2013/0328416 A1* | 12/2013 | Whitworth | .............. | H02J 17/00 307/149 |
| 2015/0170210 A1* | 6/2015 | Rhee | ................... | G06Q 30/0241 705/14.64 |
| 2015/0199546 A1* | 7/2015 | Sato | ................... | G06K 7/10316 340/10.51 |
| 2015/0244422 A1* | 8/2015 | Ohashi | ................ | H04B 5/0031 455/41.1 |
| 2016/0019574 A1* | 1/2016 | Herkert | .............. | G06Q 30/0225 705/14.26 |
| 2016/0277626 A1* | 9/2016 | Sato | .................... | H04N 1/2158 |
| 2016/0321011 A1* | 11/2016 | Sato | ..................... | G06F 3/0659 |
| 2017/0006085 A1* | 1/2017 | Machida | ................ | H04L 67/10 |
| 2017/0010811 A1* | 1/2017 | Sato | ........................ | G06Q 30/02 |
| 2017/0091123 A1* | 3/2017 | Sato | ........................ | G06F 21/44 |
| 2017/0099565 A1* | 4/2017 | Sato | ........................ | H04B 5/0031 |
| 2017/0099646 A1* | 4/2017 | Ido | .................... | G06K 9/00577 |
| 2017/0230069 A1* | 8/2017 | Ido | ........................ | H04B 1/385 |

* cited by examiner

FIG. 2

| ELECTRONIC DEVICE ID (1051) | FLAG ID (1052) | STATUS (1053) |
|---|---|---|
| 01 | 0101 | 1 (ON) |
|  | 0102 | 0 (OFF) |
|  | 0103 | 0 (OFF) |
|  | 0104 | 0 (OFF) |
|  | ⋮ | ⋮ |
| 02 | 0201 | 1 (ON) |
|  | 0202 | 0 (OFF) |
|  | 0203 | 1 (ON) |
|  | 0204 | 0 (OFF) |
|  | ⋮ | ⋮ |
| ⋮ | ⋮ | ⋮ |

| ELECTRONIC DEVICE ID (1051) | FLAG ID (1052) | STATUS (1053) | NUMBER OF TIMES (1054) | DATE AND TIME (1055) | LOCATION (1056) |
|---|---|---|---|---|---|
| 01 | 0101 | 1 (ON) | 5 | 2016/1/10 | A |
|  | 0102 | 0 (OFF) | 3 | 2016/3/5 | B |
|  | 0103 | 0 (OFF) | 1 | 2016/2/15 | C |
|  | 0104 | 0 (OFF) | 0 | — | — |
|  | ⋮ | ⋮ | ⋮ | ⋮ | ⋮ |
| 02 | 0201 | 1 (ON) | 2 | 2015/11/25 | B |
|  | 0202 | 0 (OFF) | 4 | 2015/9/15 | A |
|  | 0203 | 0 (OFF) | 0 | — | — |
|  | 0204 | 1 (ON) | 3 | 2016/4/10 | D |
|  | ⋮ | ⋮ | ⋮ | ⋮ | ⋮ |
| ⋮ | ⋮ | ⋮ | ⋮ | ⋮ | ⋮ |

| ELECTRONIC DEVICE ID | FLAG ID | CONTENT ID |
|---|---|---|
| 01 | 0101 | C0101 |
|  | 0102 | C0102 |
|  | 0103 | C0103 |
|  | 0104 | C0101<br>C0102<br>C0103 |
|  | 0105<br>0106 | C0104 |
|  | ⋮ | ⋮ |
| 02 | 0201 | C0201 |
|  | 0202 | C0202 |
|  | 0203 | C0203 |
|  | 0204 | C0101<br>C0204 |
|  | 0101<br>0205 | C0205 |
|  | ⋮ | ⋮ |
| ⋮ | ⋮ | ⋮ |

1031 — ELECTRONIC DEVICE ID
1032 — FLAG ID
1033 — CONTENT ID
103

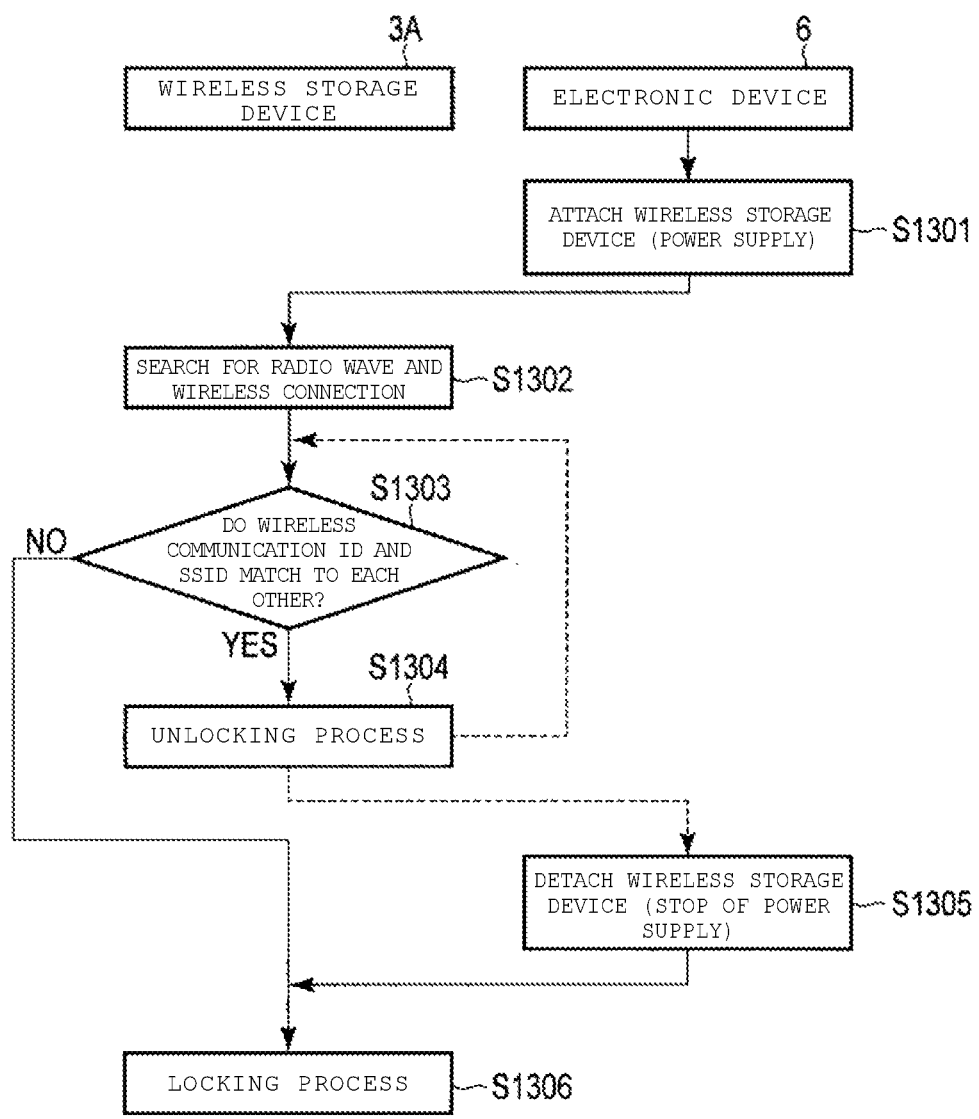

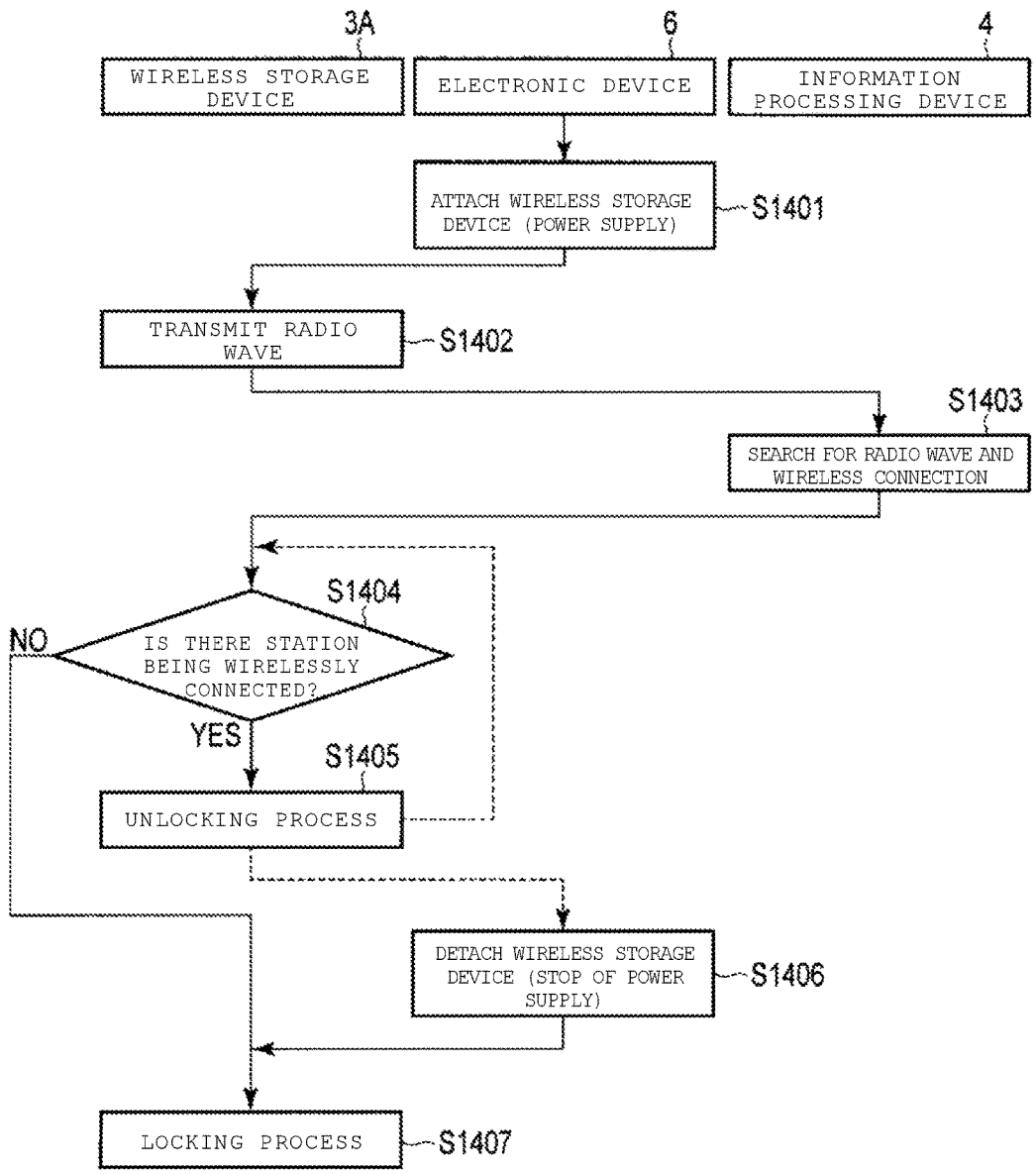

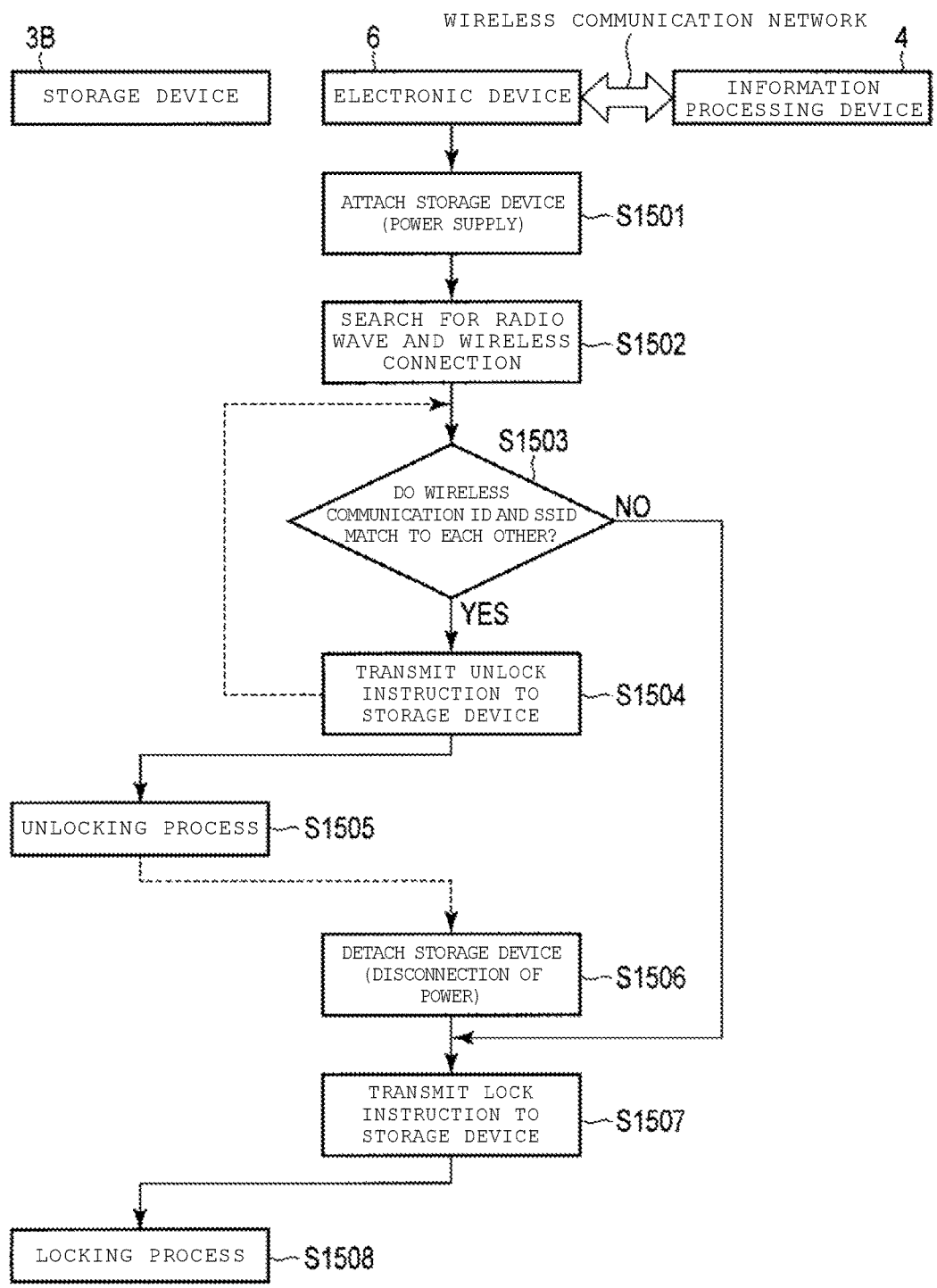

STORAGE DEVICE AND INFORMATION PROCESSING SYSTEM

CROSS-REFERENCE TO RELATED APPLICATION

This application is based upon and claims the benefit of priority from Japanese Patent Application No. 2016-161199, filed Aug. 19, 2016, the entire contents of which are incorporated herein by reference.

FIELD

Embodiments described herein relate generally to a storage device and an information processing system.

BACKGROUND

An electronic device can store data in a storage device attached thereto, or can read data stored in the storage device. As an example of the storage device, there is a memory card that includes a wireless antenna, and has a wireless communication function.

DESCRIPTION OF THE DRAWINGS

FIG. 2 is a data structure diagram showing a first example of a flag table according to the first embodiment.

FIG. 3 is a data structure diagram showing a second example of a flag table according to the first embodiment.

FIG. 4 is a data structure diagram showing a content table according to the first embodiment.

FIG. 13 is a flowchart showing an example of an unlocking process and a locking process in which the wireless storage device functions as a station.

FIG. 14 is a flowchart showing an example of the unlocking process and the locking process in which the wireless storage device functions as an access point.

FIG. 15 is a flowchart showing a modification example of the unlocking process and the locking process according to the third embodiment.

DETAILED DESCRIPTION

Figure 1:
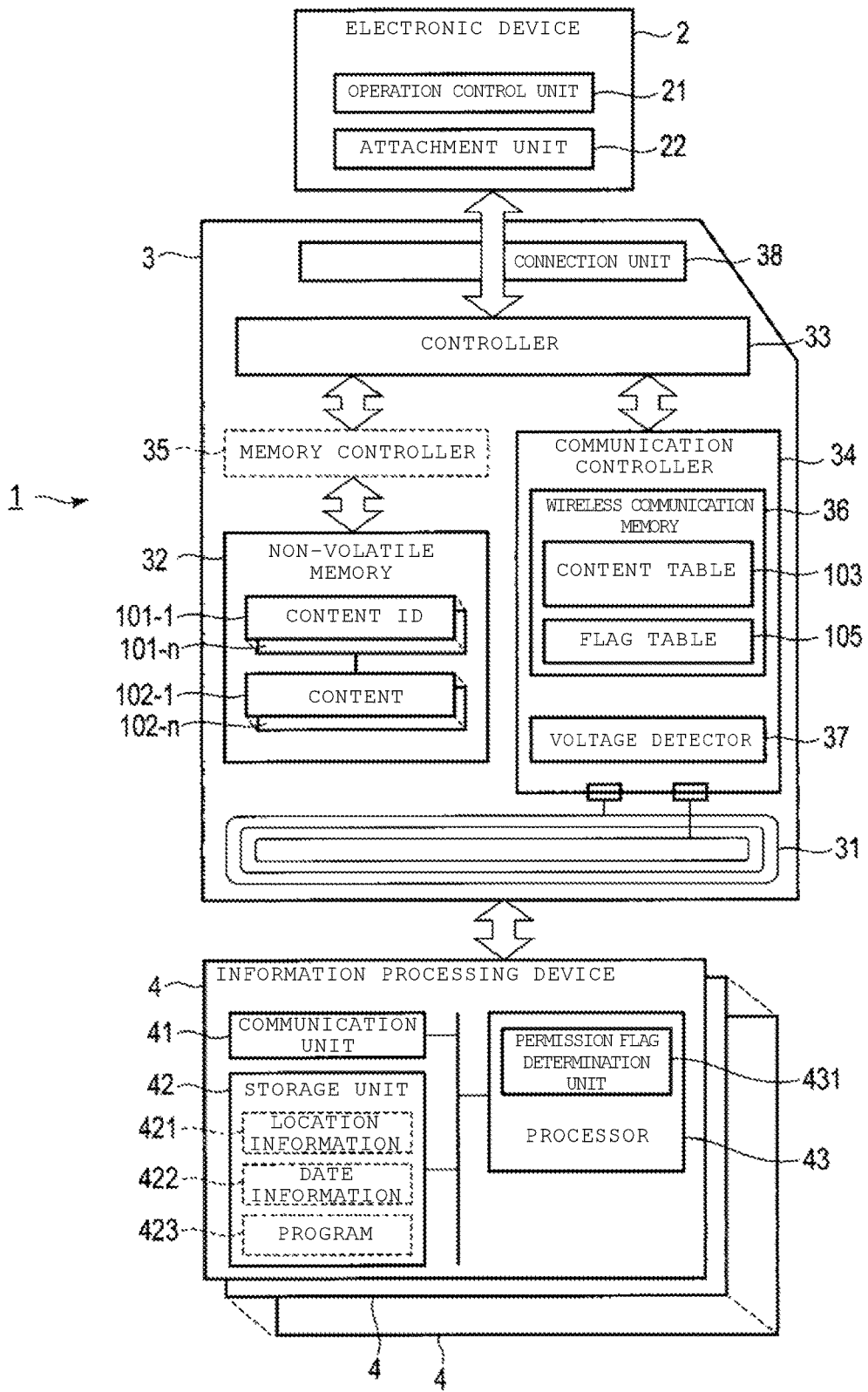
FIG. 1 is a block diagram showing an example of a configuration of an information processing system according to a first embodiment.

Embodiments provide a storage device and an information processing system which allows or disallows access to content stored in a non-volatile memory.

In general, according to one embodiment, a storage device includes a connection unit to which a first external device is to be connected, a first non-volatile memory in which content items are stored with associated content IDs, a first controller configured to access the content items stored in the first non-volatile memory, an antenna, a second non-volatile memory in which permission information is stored, and a second controller configured to update the permission information stored in the second non-volatile memory based on update information received from a second external device through the antenna. The update information is contained in radio waves transmitted by the second external device and the radio waves cause the antenna to generate power by electromagnetic induction, the generated power supplying power necessary to operate the second non-volatile memory and the second controller. In response to a read command from the first external device that is connected to the storage device via the connection unit, the first controller performs a read of one of the content items based on the updated permission information.

Hereinafter, embodiments will be described with reference to the drawings. In the following description, the same functions and components will be assigned the same reference numerals, and description thereof will be repeated as needed.

First Embodiment

In the present embodiment, a storage device (hereinafter, referred to as a wireless storage device) having a wireless communication function, an electronic device to which the wireless storage device can be attached, an information processing apparatus capable of performing wireless communication with the wireless storage device, and an information processing system including the electronic device, the wireless storage device, and the information processing device will be described.

In the present embodiment, the wireless storage device manages read access to the content stored in a non-volatile memory of the wireless storage device by an external device by using status data (flag) corresponding to the content. Specifically, the information processing device performs wireless communication with the wireless storage device to set status data stored in a wireless communication memory of the wireless storage device. The wireless storage device allows access to the content corresponding to the status data if the status data is turned on (e.g., set to 1), and disallows access to the content corresponding to the status data if the status data is turned off (e.g., set to 0).

In the present embodiment, the user can change the status data corresponding to the content stored in the wireless storage device by causing the information processing device to touch or be in close contact with the wireless storage device.

Although it will be described in the present embodiment that the wireless storage device changes the status data based on information or instruction received from the information processing device, the status data may be changed based on information or instruction received from the electronic device.

In the present embodiment, it is assumed that "ID" means identification information, and it is assumed that access represents both writing and reading data in and from a memory.

In the present embodiment, a case where allowing or disallowing reading of the content stored in the non-volatile memory is switched will be described. However, for example, allowing or disallowing of reading the content stored in the non-volatile memory and to store the content in the non-volatile memory may be switched.

In the present embodiment, the content may be, for example, image data (still image data or moving image data), sound data (music data or voice data), video data, text data, other data, a program, information, or software.

FIG. 1 is a block diagram showing an example of a configuration of the information processing system according to the present embodiment.

An information processing system 1 includes an electronic device 2, a wireless storage device 3, and an information processing device 4.

The electronic device 2 may be, for example, a toy, a smart phone, a game device, a cellular telephone, an information processing device, a computer, a wearable terminal, a digital camera, or a communication device.

The electronic device 2 includes an operation control unit 21, and an attachment unit 22.

The operation control unit 21 determines a content ID indicating the content as reading target, and reads the content corresponding to the content ID from the wireless storage device 3 attached to the attachment unit 22. For example, the operation control unit 21 may cause the wireless storage device 3 attached to the attachment unit 22 to determine the content ID indicating the content as the reading target, and may read the content corresponding to the content ID from the wireless storage device 3 via the attachment unit 22. The operation control unit 21 outputs the read content. The content ID may be a content-specific identification number, or may be a storage location address of the content.

It is assumed that the wireless storage device 3 can be attached to or detached from the electronic device 2 through the attachment unit 22.

For example, the user can insert the wireless storage device 3 into the attachment unit 22, and can detach the wireless storage device 3 from (draw out of) the attachment unit 22.

If the wireless storage device 3 is attached to the attachment unit 22, the electronic device 2 is electrically connected to the wireless storage device 3, and transmits or receives a command, an address, data, information, an instruction, or a signal to or from the wireless storage device 3.

The wireless storage device 3 is a storage device having a wireless communication function, and may be, for example, various storage devices such as a memory card (an SD memory card or a MultiMediaCard), a universal serial bus (USB) memory, a hard disk drive (HDD), and a solid state disk (SSD). In the present embodiment, a case where the wireless storage device 3 is the memory card will be described as an example.

In the present embodiment, the wireless storage device 3 performs wireless communication that conforms to the near-field communication standard (referred to herein as "NFC"), which is a short-range radio communication standard at a frequency of, for example, 13.56 MHz. However, the wireless communication performed by the wireless storage device 3 may conform to another wireless communication standard, such as wireless local area network (LAN) standard. In general, communication using NFC consumes less power than that communication that conforms to the wireless LAN standard.

If the wireless storage device 3 is attached to the attachment unit 22 of the electronic device 2, the wireless storage device 3 is electrically connected to the electronic device 2 by a connection unit 38, to be described below, and receives power from the electronic device 2 therethrough. The wireless storage device 3 has a function (writing function) of storing data from the electronic device 2 and a function (reading function) of transmitting read data to the electronic device 2. The wireless storage device 3 has a function of communicating data by using a power generated from electromagnetic induction of a wireless antenna 31, to be described below, even though the power is not received from the electronic device 2. That is, for example, the wireless storage device 3 performs wireless communication, and transmits or receives data to or from the information processing device 4. Even though power is not received from the electronic device 2, the wireless storage device 3 may operate a part of the components based on the power generated from the electromagnetic induction caused by radio waves from the information processing device 4.

In the present embodiment, for example, the wireless storage device 3 transmits or receives data to or from the electronic device 2 through a wired interface such as an SD interface, but may use another interface. For example, the wireless storage device 3 transmits or receives data to or from the information processing device 4 by using an NFC interface, but may use another wireless communication interface.

The wireless storage device 3 includes a wireless antenna 31, a non-volatile memory 32, a controller 33, a communication controller 34, a memory controller 35, and a connection unit 38. The communication controller 34 includes a wireless communication memory 36, and a voltage detector 37. The communication controller 34 and the wireless communication memory 36 may be separated. The controller 33, the communication controller 34, and the memory controller 35 may be combined, or may be separated. For example, the memory controller 35 may be built into the controller 33. The controller 33 and the memory controller 35 may be formed as a single chip.

The wireless antenna 31 is, for example, a PCB pattern antenna. A frequency band at which the wireless antenna 31 can operate may be a predetermined frequency band corresponding to NFC.

For example, the wireless antenna 31 may generate power generated from the electromagnetic induction caused by the radio waves from the information processing device 4. The wireless antenna 31 supplies the generated power to the communication controller 34.

The wireless antenna 31 receives a command, an address, data, information, an instruction, or a signal from the information processing device 4. The wireless antenna 31 outputs the received command or the like to the communication controller 34. The wireless antenna 31 also transmits a command, an address, data, information, an instruction, or a signal from the communication controller 34 to the information processing device 4.

The communication controller 34 may operate as a result of the wireless storage device 3 receiving power from the wireless antenna 31, even though it does not receive power from the electronic device 2. That is, if the wireless antenna 31 receives radio waves having predetermined frequencies corresponding to NFC, the communication controller 34 may operate, and the wireless storage device 3 may perform communication using NFC.

Meanwhile, the controller 33, the memory controller 35, and the non-volatile memory 32 operate when the wireless storage device 3 receives the power from the electronic device 2. If the wireless storage device 3 receives the power only via the wireless antenna 31 and the does not receive the power from the electronic device 2, the controller 33, the memory controller 35, and the non-volatile memory 32 may not necessarily operate.

The non-volatile memory 32 may be, for example, a nonvolatile semiconductor memory. It is assumed that the non-volatile memory 32 is, for example, a NAND flash memory, but the non-volatile memory may be another non-volatile semiconductor memory such as a NOR flash memory, a magnetoresistive random-access memory (MRAM), a phase-change random-access memory (PRAM), a resistive random-access memory (ReRAM), or a ferroelectric random-access memory (FRAM). For example, the non-volatile memory 32 may be another non-volatile memory, or a magnetic memory. For example, the non-volatile memory 32 may be a three-dimensional semiconductor memory.

The non-volatile memory 32 operates if the electronic device 2 supplies the power to the wireless storage device 3.

The non-volatile memory 32 stores one or more contents and one or more content IDs for the contents so as to associate the contents with the content IDs. In the example of FIG. 1, for example, the non-volatile memory 32 stores contents 102-1 to 102-n, content IDs 101-1 to 101-n respectively for the contents 102-1 to 102-n so as to associate the contents with the content IDs. The controller 33 may read the contents 102-1 to 102-n stored in the non-volatile memory 32 based on the content IDs 101-1 to 101-n via the memory controller 35. The contents 102-1 to 102-n may be stored in a predetermined memory area, and the controller 33 may read the contents 102-1 to 102-n based on an address indicating the predetermined memory area via the memory controller 35.

If the electronic device 2 to which the wireless storage device 3 is plural in number, the non-volatile memory 32 may store contents and content IDs corresponding to electronic device IDs in areas divided according to the electronic device IDs. The electronic device ID is unique identification information assigned to each electronic device 2.

The controller 33 is a bridge controller provided between the memory controller 35 and the communication controller 34. The controller 33 receives a command, an address, data, information, an instruction, or a signal from the electronic device 2 via the connection unit 38, the memory controller 35, or the communication controller 34. The controller 33 also transmits a command, an address, data, information, an instruction, or a signal to the electronic device 2 via the connection unit 38, the memory controller 35, or the communication controller 34 based on the received command.

More specifically, if an instruction to read the content is received from the electronic device 2 via the connection unit 38, the controller 33 reads a content table 103 and a flag table 105 from the wireless communication memory 36 via the communication controller 34, and determines whether to allow or disallow reading of the content based on the read content table 103 and the read flag table 105. If the reading of the content is allowed, the controller 33 reads the content from the non-volatile memory 32 via the memory controller 35, and transmits the read content to the electronic device 2 via the connection unit 38.

If the reading of the content is disallowed, the controller 33 may transmit a signal indicating that the reading of the content is disallowed to the electronic device 2 via the connection unit 38.

The content table 103 is a table that associates the content ID with information for determining whether to allow or disallow reading of the content corresponding to the content ID from the non-volatile memory 32. For example, the information may include a flag ID which is identification information of status data, and status data corresponding to the flag ID. The controller 33 determines whether or not the content indicated by the content ID included in the content table 103 can be read from the non-volatile memory 32 via the memory controller 35 by using this information. The details of the content table 103 will be described below with reference to FIG. 4. Although the content table 103 is stored in the wireless communication memory 36 in the present embodiment, the content table may be stored in, for example, another memory such as a memory (not shown) provided in the controller 33.

The flag table 105 is a table for managing flag information, and is, for example, a table that associates a flag ID with status data corresponding to the flag ID as stated above. Hereinafter, various data included in the flag table 105 are referred to as flag information. The details of the flag table 105 will be described with reference to FIG. 2 or 3.

The content table 103 and the flag table 105 may be represented as one table, or may be represented as three or more tables instead of being represented as two or more table as in the present embodiment.

The memory controller 35 controls the non-volatile memory 32. For example, the memory controller 35 stores data in the non-volatile memory 32 based on the command input from the controller 33. For example, the memory controller 35 reads data from the non-volatile memory 32 based on the command input from the controller 33, and transmits the data to the controller 33. The memory controller 35 may communicate with the communication controller 34, or the electronic device 2 via the connection unit 38 without passing through the controller 33.

The communication controller 34 performs wireless communication with the information processing device 4 via the wireless antenna 31. The communication controller 34 receives a command, an address, data, information, an instruction, or a signal from the controller 33 or the wireless antenna 31. The communication controller 34 also transmits a command to the controller 33 or the wireless antenna 31 based on the received command. The communication controller 34 reads data from the wireless communication memory 36 based on the received command or address, and transmits the data to the controller 33 or the wireless antenna 31. If the command, the address, or the data is received via the controller 33 or the wireless antenna 31, the communication controller 34 stores the data in the wireless communication memory 36 based on the received command, address, or data. The communication controller 34 may communicate with the memory controller 35 or the electronic device 2 via the connection unit 38 without passing through the controller 33.

The formats of the commands, addresses, data, information, instructions, or signals communicated between the electronic device 2, the wireless antenna 31, the controller 33, the communication controller 34, and the memory controller 35 do not necessarily need to match to each other. As long as the commands, the addresses, the data, the information, the instructions, or the signals can be recognized by both components communicating with each other, the formats of the commands, the addresses, the data, the information, the instructions, or the signals do not need to match.

The wireless communication memory 36 includes the content table 103, and the flag table 105.

If an instruction to read a part or all of at least one table of the content table 103 and the flag table 105, is received via the connection unit 38 and the controller 33 from the electronic device 2 or via the wireless antenna 31 from the information processing device 4, the communication controller 34 reads a part or the whole of the table stored in the wireless communication memory 36, and transmits a part or the whole of the read table to the electronic device 2 via the controller 33 and the connection unit 38 or to the information processing device 4 via the wireless antenna 31.

If an instruction to write a part or all of at least one table of the content table 103 and the flag table 105 is received via the connection unit 38 and the controller 33 from the electronic device 2 or via the wireless antenna 31 from the information processing device 4, the communication controller 34 writes or updates a part or the whole of the table in the wireless communication memory 36.

The wireless communication memory 36 is, for example, a non-volatile memory. The wireless communication memory 36 stores data under the control of the communication controller 34. However, the wireless communication memory 36 may store data under the control of the memory controller 35 or the controller 33. For example, an electrically erasable programmable read-only memory (EEPROM) is used as the wireless communication memory 36, but various memories may be used similarly to the non-volatile memory 32.

Since the wireless storage device can operate with the power supplied from the wireless antenna 31, the power consumption per unit capacity of the non-volatile memory used as the wireless communication memory 36 is preferably lower than the power consumption of the non-volatile memory 32. Specifically, a NOR memory may be used as the wireless communication memory 36.

The voltage detector 37 is electrically connected to the wireless antenna 31. The voltage detector 37 detects a voltage supplied to the communication controller 34 from the wireless antenna 31. The voltage detector 37 outputs a reset command until the voltage reaches a predetermined voltage at which the communication controller 34 can operate. The communication controller 34 does not perform the communication using NFC while the reset command is received from the voltage detector 37. It is possible to prevent abnormal activation or operation of the communication using NFC by using the reset command. If the voltage reaches the predetermined voltage, the voltage detector 37 may transmit an operation available command to the communication controller 34. In this case, if the operation available command is received, the communication controller 34 performs the communication using NFC.

The connection unit 38 is, for example, a standardized connection terminal, and may be electrically connected to the attachment unit 22 of the electronic device 2.

For example, the information processing device 4 may be a cellular phone (including a smart phone), a computer, a game device, a station device, a wearable terminal, or a communication device. For example, the station device is an information processing device installed in a shopping mall, an electrical appliance store, a toy store, or an amusement park. The information processing device 4 may transmit or receive a command, an address, data, information, an instruction, or a signal to or from the wireless storage device 3.

For example, the information processing device 4 includes a communication unit 41, a storage unit 42, and a processor 43. For example, the processor 43 functions as a permission flag determination unit 431 by executing a program 423 stored in the storage unit 42.

The communication unit 41 controls the reception of the command, data, information, instruction, or signal transmitted to the information processing device 4 from the wireless antenna 31 of the wireless storage device 3. The communication unit 41 controls the transmission of the command, address, data, information, instruction, or signal to the wireless storage device 3 from the information processing device 4.

More specifically, the communication unit 41 transmits an instruction to read a part or all of at least one table of the content table 103 and the flag table 105 to the wireless storage device 3 through wireless communication. The communication unit 41 receives apart or the whole of the table from the wireless antenna 31 of the wireless storage device 3 through wireless communication. The communication unit 41 transmits an instruction to write a part or all of at least table of the content table 103 and the flag table 105, in other words, information to be stored in the storage unit 42 to the wireless storage device 3 through wireless communication.

For example, the storage unit 42 includes location information 421 of the information processing device 4, date information 422, and a program 423.

The location information 421 is information indicating a location of the information processing device 4, and is, for example, information acquired by the Global Positioning System (GPS).

The date information 422 is information regarding a date. For example, the date information 422 may be a current date, time, or season. The date information 422 may be information acquired by associating a date with an event or a specific period corresponding to the date. The event or the specific period is, for example, New Year's day, Setsubun (the day before the beginning of spring in Japan), Hinamatsuri (Doll's Day in Japan), Children's Day, spring vacation, summer vacation, Christmas, or Omisoka (the eve of New Year's day).

The location information 421 and the date information 422 do not necessarily need to be stored in the storage unit 42. For example, if the communication unit 41 performs wireless communication with the wireless storage device 3, the communication unit 41 or the permission flag determination unit 431 may acquire the date and the current position of the information processing device 4 if necessary, and may transmit the acquired information to the wireless storage device 3 through wireless communication via the communication unit 41.

In the present embodiment, the location information 421 and the date information 422 may not be used. The storage unit 42 may include information different from the location information 421 and the date information 422.

The permission flag determination unit 431 performs wireless communication with the wireless storage device 3 via the communication unit 41, reads a part or the whole of the table of the wireless communication memory 36, and determines whether or not to update the status data included in the read table.

If the status data is updated, the permission flag determination unit 431 generates a part or the whole of the updated flag table 105, and transmits a part or the whole of the generated table to the wireless storage device 3 via the communication unit 41. The wireless antenna 31 of the wireless storage device 3 transmits a part or the whole of the received table to the communication controller 34, and the communication controller 34 stores a part or the whole of the received table in the wireless communication memory 36.

For example, the permission flag determination unit 431 may determine whether or not to update specific status data included in the flag table 105 based on the location information 421 or the date information 422. For example, when the wireless storage device 3 and the information processing device 4 perform wireless communication, the permission flag determination unit 431 may read a part or the whole of the table from the wireless communication memory 36 of the wireless storage device 3 via the communication controller 34, the wireless antenna 31, and the communication unit 41 of the information processing device 4, and may determine whether or not to update specific status data included in the flag table 105 based on a part or the whole of the read table.

If the communication controller 34 can control the flag table 105 according to the command received from the information processing device 4, the permission flag determination unit 431 may transmit a command for updating specific status data included in the flag table 105 to the wireless storage device 3 via the communication unit 41. In this case, the communication controller 34 of the wireless storage device 3 updates the status data included in the flag table 105 according to the update command.

FIG. 2 is a data structure diagram showing a first example of the flag table 105 according to the present embodiment. Although the flag table 105 is described by the table in FIG. 2, the flag table 105 may be described by, for example, another data structure such as a list structure. The same is true of FIGS. 3 and 4 to be described below.

For example, a flag table 105a as a first example of the flag table 105 is acquired by associating an electronic device ID 1051, a flag ID 1052, and status data 1053 corresponding to the flag ID 1052 with one another.

In the flag table 105a, at least one flag ID 1052 is associated with the electronic device ID 1051, and the status data 1053 is associated with the flag ID 1052.

For example, the status data 1053 is equivalent to a flag designated by each flag ID 1052, and indicates that the status data is active (turned on) or is inactive (turned off). The status data 1053 may be a value of 1 or 0 indicating that the status data is turned on or off. The status data 1053 may be another value other than 1 or 0.

The flag ID 1052 may include the electronic device ID 1051. For example, two higher-digit numbers of the flag ID 1052 may represent the electronic device ID 1051, as shown in FIG. 2. In such a case, a column of the electronic device ID 1051 of the flag table 105a may be removed from the flag table 105a.

The flag table 105a may include the details of the content table 103. In such a case, the flag table 105a includes a content ID of content associated with each flag ID 1052.

FIG. 3 is a data structure diagram showing a second example of the flag table 105 according to the present embodiment.

For example, a flag table 105b as a second example of the flag table 105 is acquired by associating the electronic device ID 1051, the flag ID 1052, the status data 1053 corresponding to the flag ID 1052, number-of-times data 1054, date and time data 1055, and location data 1056 with one another.

The electronic device ID 1051, the flag ID 1052, and the status data 1053 are the same as those in FIG. 2.

For example, the number-of-times data 1054 may be data indicating the number of times the flag ID 1052 is received through wireless communication with the wireless storage device 3 and the information processing device 4. For example, if the flag ID 1052 is received via the wireless antenna 31, the communication controller 34 increases the number-of-times data 1054 corresponding to the received flag ID 1052 one by one.

For example, the permission flag determination unit 431 of the information processing device 4 receives the number-of-times data 1054 corresponding to the flag ID 1052 from the wireless communication memory 36 via the communication controller 34, the wireless antenna 31 and the communication unit 41, and increases the received number-of-times data 1054 one by one. The permission flag determination unit 431 transmits the number-of-times data 1054 corresponding to the flag ID 1052 to the communication controller 34 via the communication unit 41 and the wireless antenna 31. The communication controller 34 stores the number-of-times data 1054 corresponding to the received flag ID 1052 in the wireless communication memory 36.

If the number-of-times data 1054 corresponding to any flag ID 1052 of the flag table 105 received from the wireless storage device 3 via the communication unit 41 is equal to or greater than a predetermined number of times, the permission flag determination unit 431 may transmit flag information indicating that the status data 1053 corresponding to the flag ID 1052 of which the number-of-times data 1054 is equal to or greater than the predetermined number of times is turned on to the wireless storage device 3 via the communication unit 41. In such a case, the communication controller 34 stores the flag information received from the information processing device 4 via the wireless antenna 31 in the wireless communication memory 36.

For example, the date and time data 1055 may be data indicating the latest date and time when the number-of-times data 1054 corresponding to the flag ID 1052 is updated.

For example, the location data 1056 may be data indicating the latest location where the number-of-times data 1054 corresponding to the flag ID 1052 is updated. A location designated by the location data 1056 is equivalent to a location where the information processing device 4 and the wireless storage device 3 wirelessly communicate the flag ID 1052. For example, the location data 1056 may be GPS data, or may be data indicating a region set to the information processing device 4.

For example, the permission flag determination unit 431 of the information processing device 4 reads flag information which is a part or all of items the flag table 105b from the wireless storage device 3 via the communication unit 41, updates the number-of-times data 1054, the date and time data 1055, and the location data 1056 which correspond to the flag ID 1052 included in the read flag information, and transmits the updated flag information to the wireless storage device 3 via the communication unit 41. If a date and time indicating the date and time data 1055 of the read flag information is included in a predetermined range, the permission flag determination unit 431 transmits the updated flag information indicating that the status data 1053 of the flag ID 1052 corresponding to the date and time data 1055 is turned on to the wireless storage device 3 via the communication unit 41. If the location indicating the location data 1056 of the read flag information is included in a predetermined range, the permission flag determination unit 431 transmits the flag information indicating that the status data 1053 of the flag ID 1052 corresponding to the location data 1056 is turned on to the wireless storage device 3 via the communication unit 41. The communication controller 34 of the wireless storage device 3 receives the updated flag information from the information processing device 4 via the wireless antenna 31, and stores the updated flag information in the wireless communication memory 36.

A condition in which the status data 1053 corresponding to the flag ID 1052 is turned on or off may be appropriately changed. For example, the permission flag determination unit 431 may determine the status data 1053 by an arbitrary combination of the number-of-times data 1054, the date and time data 1055, and the location data 1056, or another condition.

In the present embodiment, the permission flag determination unit 431 of the information processing device 4 determines the status data 1053 of the flag table 105b based on the number-of-times data 1054, the date and time data 1055, and the location data 1056 included in the flag table 105b. However, the controller 33 of the wireless storage device 3 may read the flag information of the wireless communication memory 36 via the communication controller 34, may determine the status data 1053 based on the number-of-times data 1054, the date and time data 1055, and the location data 1056, and may store the determined status data 1053 in the flag table 105b of the wireless communication memory 36 via the communication controller 34.

FIG. 4 is a data structure diagram showing the content table 103 according to the present embodiment.

For example, the content table 103 associates an electronic device ID 1031, a flag ID 1032, and a content ID 1033 with one another.

In the content table 103, one flag ID 1032 and one content ID 1033 may be associated with each other, a plurality of flag IDs 1032 and one content ID 1033 may be associated with one another, and one flag ID 1032 and a plurality of content IDs 1033 may be associated with one another.

As stated above, for example, one flag ID 1032 and the plurality of content ID 1033 are associated with one another in the content table 103, and thus, the status data 1053 corresponding to one flag ID 1032 in the flag table 105 is turned on. Thus, it is possible to allow reading of the plurality of contents corresponding to the plurality of content IDs 1033 in the content table 103.

For example, the plurality of flag IDs 1032 is associated with one content ID 1033 in the content table 103, and thus, when the status data 1053 corresponding to the plurality of flag IDs 1032 in the flag table 105 is turned on, it is possible to allow reading of one content corresponding to one content ID 1033 in the content table 103.

In the present embodiment, if the status data 1053 of a predetermined flag ID 1052 corresponding to a certain electronic device ID 1051 in the flag table 105 is turned on, the status data of a predetermined flag ID corresponding to another electronic device ID may be turned on. In addition, if the status data of a plurality of predetermined flag IDs corresponding to a plurality of electronic device IDs are turned on, the status data 1053 of a predetermined flag ID 1052 corresponding to a certain electronic device ID 1051 may be turned on.

The association aspect of the electronic device ID 1031, the flag ID 1032, and the content ID 1033 is not limited thereto, and may be appropriately changed.

If one content ID 1033 is associated with one flag ID 1032, a table that associates the content ID with the status data 1053 may be used, and the content table 103 may be omitted.

Similarly to the cases of FIGS. 2 and 3, the flag ID 1032 may include the electronic device ID 1031. In this case, the column of the electronic device ID 1031 in FIGS. 2 and 3 may be removed from the content table 103.

Figure 5:
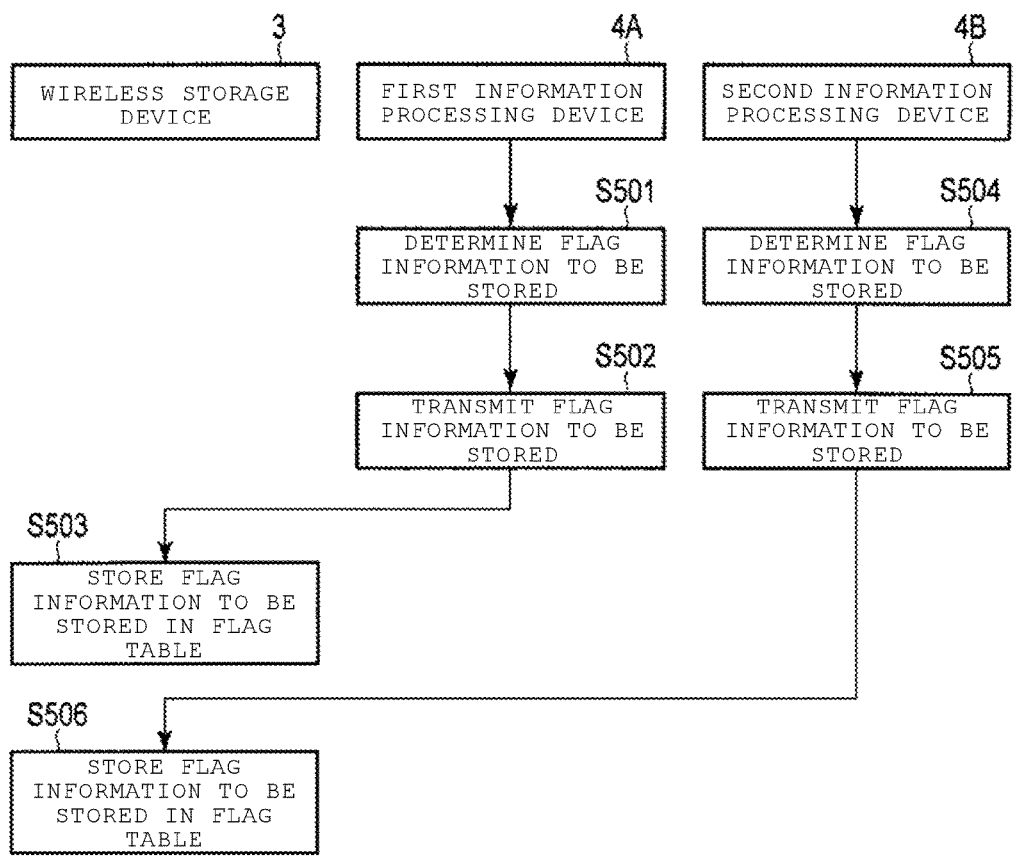
FIG. 5 is a flowchart showing a process of updating the flag table according to the first embodiment.

FIG. 5 is a flowchart showing a process of updating the flag table 105 according to the present embodiment. A first information processing device 4A and a second information processing device 4B are the same as that of the information processing device 4.

Step S501 to step S503 are a process of causing the first information processing device 4A to update the flag table 105 of the wireless storage device 3 through wireless communication.

Instep S501, the permission flag determination unit 431 of the first information processing device 4A determines flag information (updated flag information) to be stored in the flag table 105. If the flag table 105a of FIG. 2 is used as the flag table 105, the flag information to be stored is, for example, the status data 1053. If the flag table 105b of FIG. 3 is used as the flag table 105, the flag information to be stored is, for example, the status data 1053, the number-of-times data 1054, the date and time data 1055, or the location data 1056. In order to determine the flag information to be stored, the permission flag determination unit 431 reads the flag information which is a part or the whole of the flag table 105 at a current point of time from the wireless storage device 3 via the communication unit 41, and determines the flag information to be stored based on the read flag information.

In step S502, the communication unit 41 of the first information processing device 4A transmits the flag information to be stored to the wireless storage device 3.

In step S503, the communication controller 34 of the wireless storage device 3 receives the flag information to be stored from the first information processing device 4A via the wireless antenna 31, and stores the received flag information to be stored in the wireless communication memory 36. In this case, the communication controller 34 updates the flag information of the flag table 105 at a current point of time with the flag information to be stored. Accordingly, it is possible to allow or disallow access to the content by using the first information processing device 4A.

Subsequently, step S504 to step S506 are a process of causing the second information processing device 4B to update the flag table 105 of the wireless storage device 3 through wireless communication. Step S504 to step S506 are the same as step S501 to step S503 described above.

In step S504, the permission flag determination unit 431 of the second information processing device 4B determines the flag information to be stored in the flag table 105.

In step S505, the communication unit 41 of the second information processing device 4B transmits the flag information to be stored to the wireless storage device 3.

In step S506, the communication controller 34 of the wireless storage device 3 receives the flag information to be stored from the second information processing device 4B via the wireless antenna 31, and stores the received flag information to be stored in the wireless communication memory 36. Accordingly, it is possible to update a part or the whole of the existing flag table 105 stored in the wireless communication memory of the wireless storage device 3 by using the second information processing device 4B, and it is possible to switch between the allowing or disallowing access to the content by using the second information processing device 4B.

Although two information processing devices 4 that update the flag table 105 are provided in the example of FIG. 5, one information processing device 4 may be provided, or a plurality (three or more) of information processing devices may be provided. One information processing device 4 may update the flag table 105 of the wireless storage device 3 multiple times.

Figure 6:
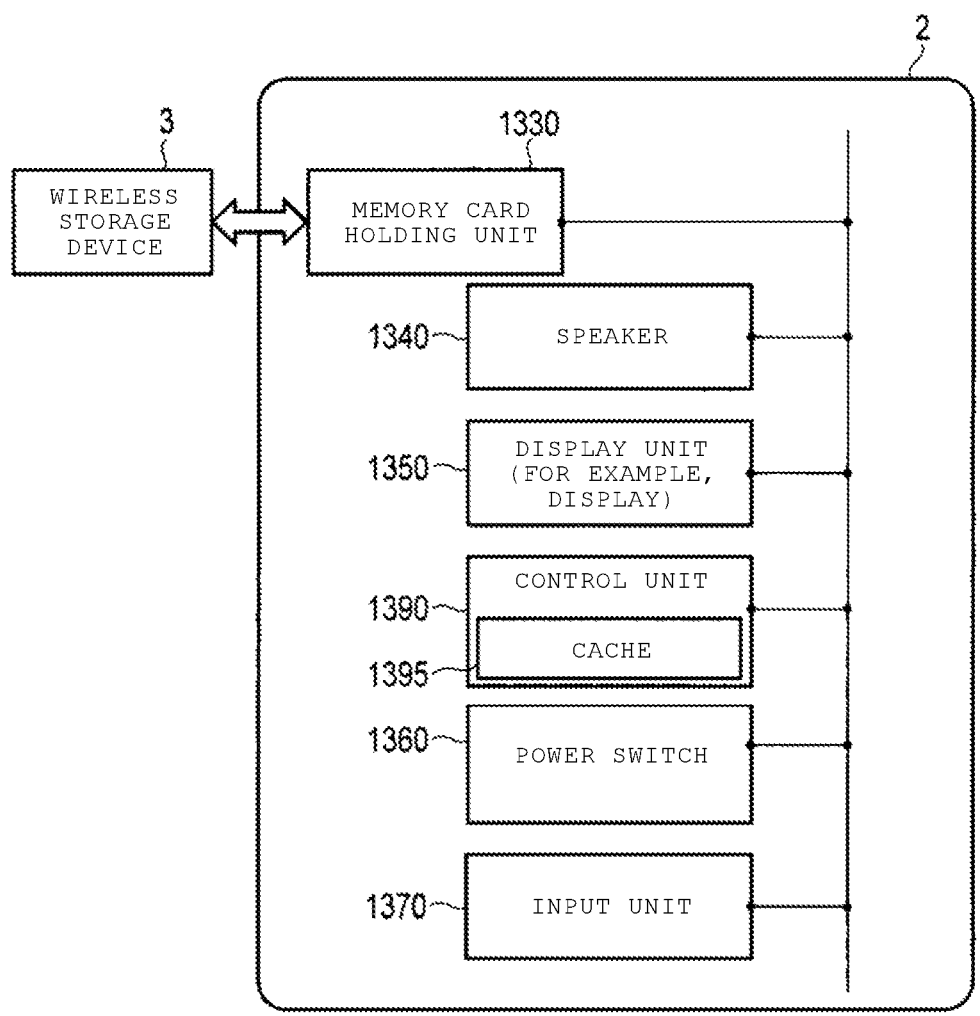
FIG. 6 is a block diagram showing a configuration of an electronic device according to the first embodiment.

FIG. 6 is a block diagram showing a configuration of the electronic device 2 according to the present embodiment.

The electronic device 2 includes, for example, a memory card holding unit 1330, a speaker 1340, a display unit 1350, and a control unit 1390.

A storage device, for example, a memory card can be inserted into the memory card holding unit 1330 from the outside. In the present embodiment, the memory card holding unit 1330 holds the wireless storage device 3, for example, a memory card on which an NFC chip is mounted. The memory card holding unit 1330 is equivalent to the attachment unit 22 of FIG. 1.

The speaker 1340 converts data into voice data by using a DA converter (not shown) to output the converted data to the outside.

The electronic device 2 may include the display unit 1350. The display unit 1350 may be, for example, a display. If sound data and moving image data are included in the content as an output target read by the electronic device 2 from the wireless storage device 3, the electronic device 2 may output the sound data from the speaker 1340, and may display the moving image data on the display unit 1350. The electronic device 2 may display the moving image data on the display unit 1350 without outputting the sound data from the speaker 1340.

The electronic device 2 may include a power switch 1360 capable of turning on or off the power of the electronic device 2, and an input unit 1370. The input unit 1370 may include a plurality of input means, or may be, for example, a button or a switch.

The control unit 1390 controls the speaker 1340, the display unit 1350, the power switch 1360, and the input unit 1370. The control unit 1390 is electrically connected to the wireless storage device 3 attached to the memory card holding unit 1330, and communicates the wireless storage device 3 electrically connected thereto.

In the present embodiment, the control unit 1390 may include the operation control unit 21. The control unit 1390 may be mounted by hardware, or may be realized through the execution of software by the processor.

The control unit 1390 may include a memory 1395. For example, the memory 1395 may be included in the control unit 1390, or may be provided as a separate member. For example, the memory 1395 may be used as cache memory that temporarily stores data. For example, the memory 1395 may be a serial peripheral interface (SPI) flash memory.

Figure 7:
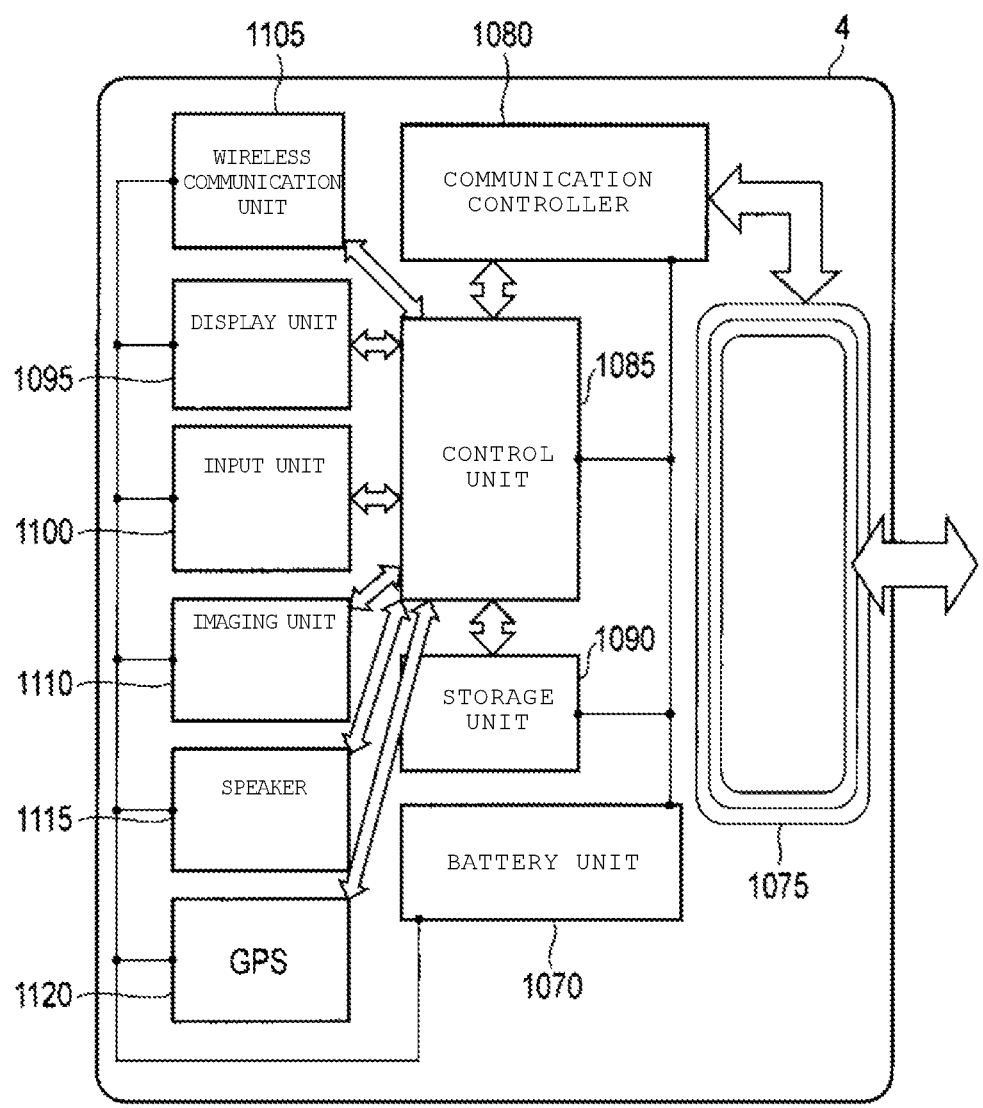
FIG. 7 is a block diagram showing a configuration of an information processing device according to the first embodiment.

FIG. 7 is a block diagram showing a configuration of the information processing device 4 according to the present embodiment.

The information processing device 4 includes a battery unit 1070, a wireless antenna 1075, a communication controller 1080, a control unit 1085, a storage unit 1090, a display unit 1095, an input unit 1100, a wireless communication unit 1105, an imaging unit 1110, a speaker 1115, and a GPS 1120. The communication controller 1080 and the control unit 1085 may be realized as one controller.

In the present embodiment, for example, the communication controller 1080 and the wireless communication unit 1105 are equivalent to the communication unit 41 of FIG. 1.

The information processing device 4 may operate and perform communication with the power supplied from the battery unit 1070.

For example, the information processing device 4 may transmit or receive data through an NFC interface. The information processing device 4 may use another wireless communication interface.

The battery unit 1070 is a power supply that supplies a power to the information processing device 4. The battery unit 1070 is, for example, a battery. The battery unit 1070 may be a dry cell, a storage battery, or a fuel cell. More specifically, the battery unit 1070 may use a lithium-ion battery. The battery unit 1070 may be provided outside of the information processing device 4, or may be, for example, an AC adapter connected to a commercial power supply.

A frequency band at which the wireless antenna 1075 can operate is set to be a predetermined frequency band corresponding to NFC.

The wireless antenna 1075 receives a command, an address, data, information, an instruction, or a signal, and outputs the received command, address, data, information, an instruction, or signal to the communication controller 1080. The wireless antenna 1075 outputs the command, address, data, information, an instruction, or signal input from the communication controller 1080. The wireless antenna 1075 is, for example, a PCB pattern antenna.

The communication controller 1080 controls the wireless antenna 1075. The communication controller 1080 may output the command, address, data, information, an instruction, or signal received from the control unit 1085 via the wireless antenna 1075. The communication controller 1080 may output the data received by the wireless antenna 1075 to the control unit 1085.

For example, the control unit 1085 controls the operations of the respective units based on the inputs from the input unit 1100, the wireless communication unit 1105, the imaging unit 1110, and the wireless storage device 3. The control unit 1085 controls the respective units based on the input data items or a calculation result of these data items, and outputs commands to the respective units if necessary.

For example, the control unit 1085 is a semiconductor chip or a circuit formed on a board, or one thereof, or a plurality of combinations thereof. The control unit 1085 may include at least one of a cache memory and a register that temporarily stores data.

The control unit 1085 may output a command, an address, data, information, an instruction, or a signal to the wireless antenna 1075 via the communication controller 1080. The control unit 1085 receives the command, address, data, information, an instruction or signal received from the wireless storage device 3, such as the command, address, data, information, an instruction, or signal received by the wireless antenna 1075, via the communication controller 1080.

If the data is written in the wireless storage device 3, the control unit 1085 outputs the data items input from the respective units, the calculation result of these data items, a write command, or an address to the communication controller 1080.

The control unit 1085 is electrically connected to the respective units, and electrically communicates with the respective units. That is, the control unit 1085 may receive data from the respective units, and may output the data items or the calculation result of these data items. For example, the control unit 1085 may calculate (generate) combined image data acquired by highlighting imaging data imaged by the imaging unit 1110, and may output the calculation result to the display unit 1095. For example, the control unit 1085 may calculate (generate) combined image data based on image data read from the storage unit 1090, and may output the calculation result to the display unit 1095. These are merely examples, and the control unit 1085 may receive the data items from the respective units, and may output the calculation result of these data items.

The control unit 1085 may be mounted by hardware, or may be realized through the execution of software by the processor. In the present embodiment, the control unit 1085 may include the permission flag determination unit 431 of FIG. 1.

The storage unit 1090 outputs the stored data to the control unit 1085 based on the communication with the control unit 1085. The storage unit 1090 stores data received from the control unit 1085 based on the communication with the control unit 1085. The storage unit 1090 is, for example, a memory controller and a non-volatile memory. Similarly to the non-volatile memory 32, various memories are used as the non-volatile memory. The memory controller controls the non-volatile memory. The storage unit 1090 may be, for example, a hard disk drive (HDD), or a solid state disk (SSD). In the present embodiment, the storage unit 1090 may include the storage unit 42 of FIG. 1.

The display unit 1095 outputs the data received from the control unit 1085 in a format capable of being recognized by the user. The display unit 1095 is, for example, a display. The user can recognize a display on the display through visual perception. Specifically, various displays such as a liquid crystal display, a plasma display, an organic EL display, and a three-dimensional display may be used as the display unit 1095. The display unit 1095 displays the data received from the control unit 1085 on the display. For example, the display unit 1095 may display the image or moving image data imaged by the imaging unit 1110 in approximately real time.

The input unit 1100 provides, as input data, the input of the user to the control unit 1085. For example, the input unit 1100 is a touch panel provided on the display. If the user presses a display on the display, the input unit 1100 detects a pressed position on the touch panel, and outputs, as input data, location information thereof to the control unit 1085. Specifically, various touch panels such as switches provided in a matrix shape, a resistive membrane type, a surface acoustic wave type, an infrared type, an electromagnetic induction type, and an electrostatic capacitance type may be used as the input unit 1100.

The input unit 1100 may be, for example, a microphone. If the user produces a voice, the input unit 1100 may detect the voice, may extract input data through voice conversion, and may output the extracted data to the control unit 1085.

The wireless communication unit 1105 includes a wireless antenna, and a wireless controller. The wireless communication unit 1105 transmits or receives data to or from the outside through wireless communication. The wireless communication unit 1105 outputs the data received from the outside to the control unit 1085. The wireless communication unit 1105 transmits the data received from the control unit 1085 to the outside.

The imaging unit 1110 may image a still image, a moving image, or both of them. The imaging unit 1110 outputs the imaging data (image data), that is, the still image or the moving image data to the control unit 1085. The imaging unit 1110 may image codes arranged on a surface of the wireless storage device 3. The imaging unit 1110 is, for example, a camera. More specifically, the imaging unit 1110 is, for example, a camera using a charge-coupled device (CCD) sensor, or a complementary metal-oxide-semiconductor (CMOS) sensor.

The speaker 1115 outputs sound data input from the control unit 1085.

The GPS 1120 acquires the location information of the information processing device 4, and outputs the acquired location information to the control unit 1085.

Figure 8:
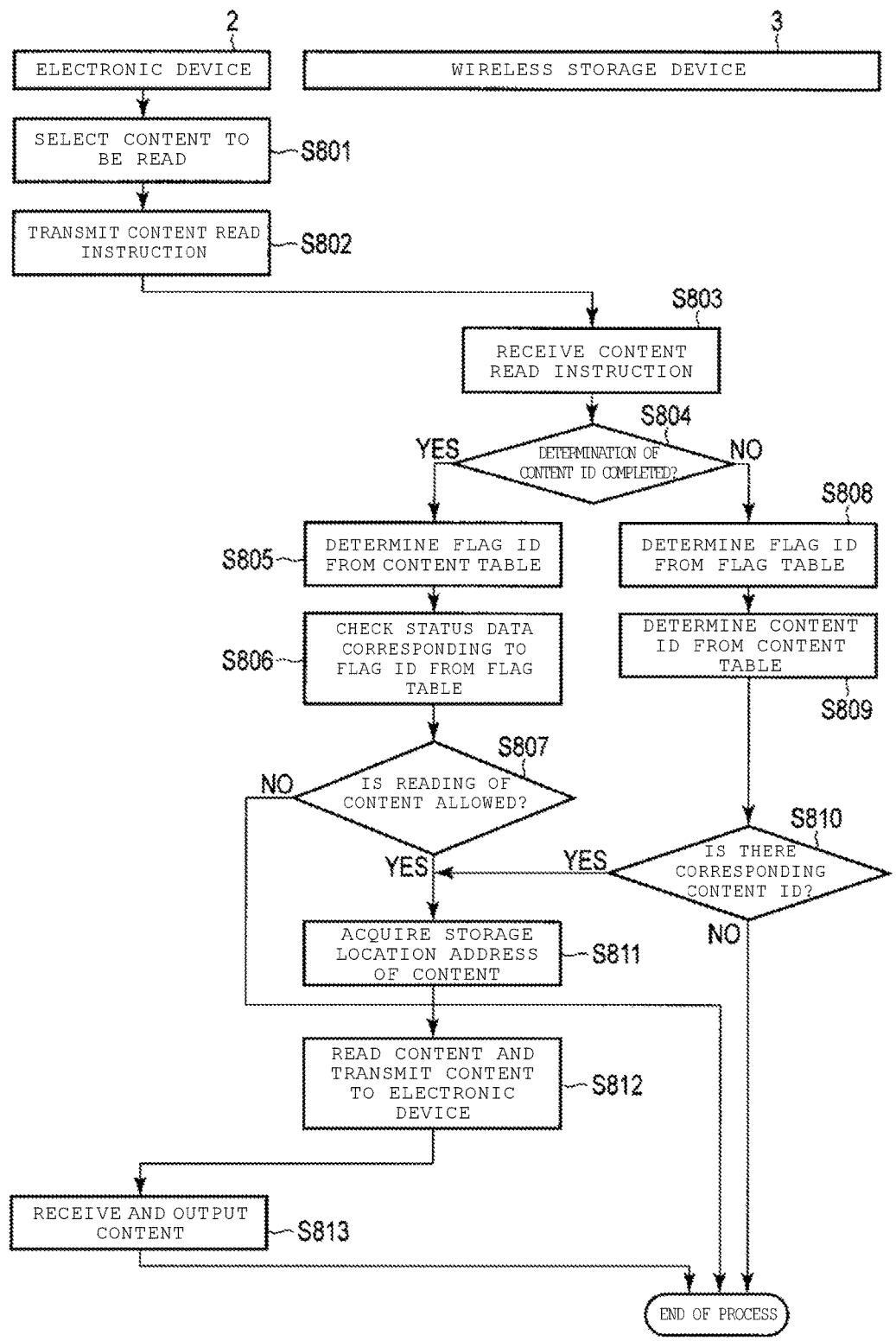
FIG. 8 is a flowchart showing a content outputting process according to the first embodiment.

FIG. 8 is a flowchart showing a content outputting process according to the present embodiment.

In step S801, the operation control unit 21 of the electronic device 2 selects content to be read from the wireless storage device 3. The operation control unit 21 may designate the content to be read using, for example, a content ID, or may designate the content to be read using, for example, a condition. For example, as the condition of the content to be read, a condition such as "content indicated by the content ID corresponding to the flag ID indicating that the status data is recently updated to be turned on" or "content indicated by the content ID corresponding to the flag ID indicating that the status data is updated in a designated region at designated date and time is turned on" is used.

In step S802, the operation control unit 21 of the electronic device 2 transmits an instruction to read the content to the wireless storage device 3 attached to the attachment unit 22. The content read instruction includes, for example, the electronic device ID. The content read instruction may include the condition of the content to be read, which is designated in step S801. If the content ID of the content to be read is designated in step S801, the content read instruction may further include the content ID of the content to be read.

In step S803, the wireless storage device 3 attached to the attachment unit 22 of the electronic device 2 receives the content read instruction.

In step S804, the controller 33 checks whether or not determination of the content ID of the content to be read is completed. If it is completed, the process proceeds to step S805. If it is not completed, the process proceeds to step S808.

In step S805, the controller 33 reads the content table 103 stored in the wireless communication memory 36 via the communication controller 34. The controller 33 determines the electronic device ID included in the content read instruction and the flag ID corresponding to the content ID of the content to be read based on the electronic device ID included in the content read instruction, the content ID of the content to be read, and the content table 103.

In step S806, the controller 33 reads the flag table 105 stored in the wireless communication memory 36 via the communication controller 34, and checks the status data corresponding to the flag ID determined in step S805.

In step S807, if the status data corresponding to the flag ID is turned on, the reading of the content to be read is allowed, and thus, the process proceeds to step S811. Meanwhile, if the status data corresponding to the flag ID is turned off, the reading of the content to be read is disallowed, and thus, the process is ended. Here, the controller 33 may check whether or not the content ID of the content to be read is included in the content IDs 101-1 to 101-n stored in the non-volatile memory 32. If the content ID of the content to be read is not included in the content IDs 101-1 to 101-n, the content to be read is not able to be read, and thus, the process is ended.

In step S808, the controller 33 reads the flag table 105 from the wireless communication memory 36 via the communication controller 34, and determines the flag ID which corresponds to the electronic device ID received in step S803 and satisfies the condition of the content to be read. Specifically, for example, if the flag table 105 is the flag table 105b shown in FIG. 4 and the condition of the content to be read is "the electronic device ID is 02 and the status data is recently updated to be turned on", the controller 33 determines the flag ID "0201" which satisfies the condition.

In step S809, the controller 33 determines the content ID of the content to be read by using the content table 103, the flag ID determined in step S808, and the electronic device ID. Specifically, for example, the controller 33 determines that the content ID of the content to be read is C0201 from the electronic device ID "02" and the flag ID "0201" determined in step S808.

In step S810, the controller 33 checks whether or not the content ID of the content to be read which is determined in step S809 is included in the content IDs 101-1 to 101-n stored in the non-volatile memory 32. If the content ID of the content to be read is included in the content IDs 101-1 to 101-n, the process proceeds to step S811. If the content ID of the content to be read is not included in the content IDs 101-1 to 101-n, the content to be read is not able to be read, and the process is ended.

In step S811, the controller 33 acquires a storage location address of the content to be read based on the content ID of the content to be read, or the content ID of the content to be read and an address conversion table (not shown).

In step S812, the controller 33 reads the content to be read via the memory controller 35 by using the storage location address of the content to be read, which is acquired in step S811, and transmits the content to be read to the electronic device 2 via the connection unit 38.

In step s813, the operation control unit 21 of the electronic device 2 receives the content to be read from the wireless storage device 3 via the attachment unit 22, and outputs the content.

In the present embodiment, an accessory may be attached to or detached from the electronic device 2. In this case, preferably, the accessory and the wireless storage device 3 may be attached to or detached from the electronic device 2. For example, the electronic device 2 may perform control for changing the content ID designated in step S801 based on the type of the attached accessory.

For example, the accessory is a material applied or appertained to the electronic device 2. The accessory is, for example, a medal, a key holder, a strap, or a card.

Figure 9:
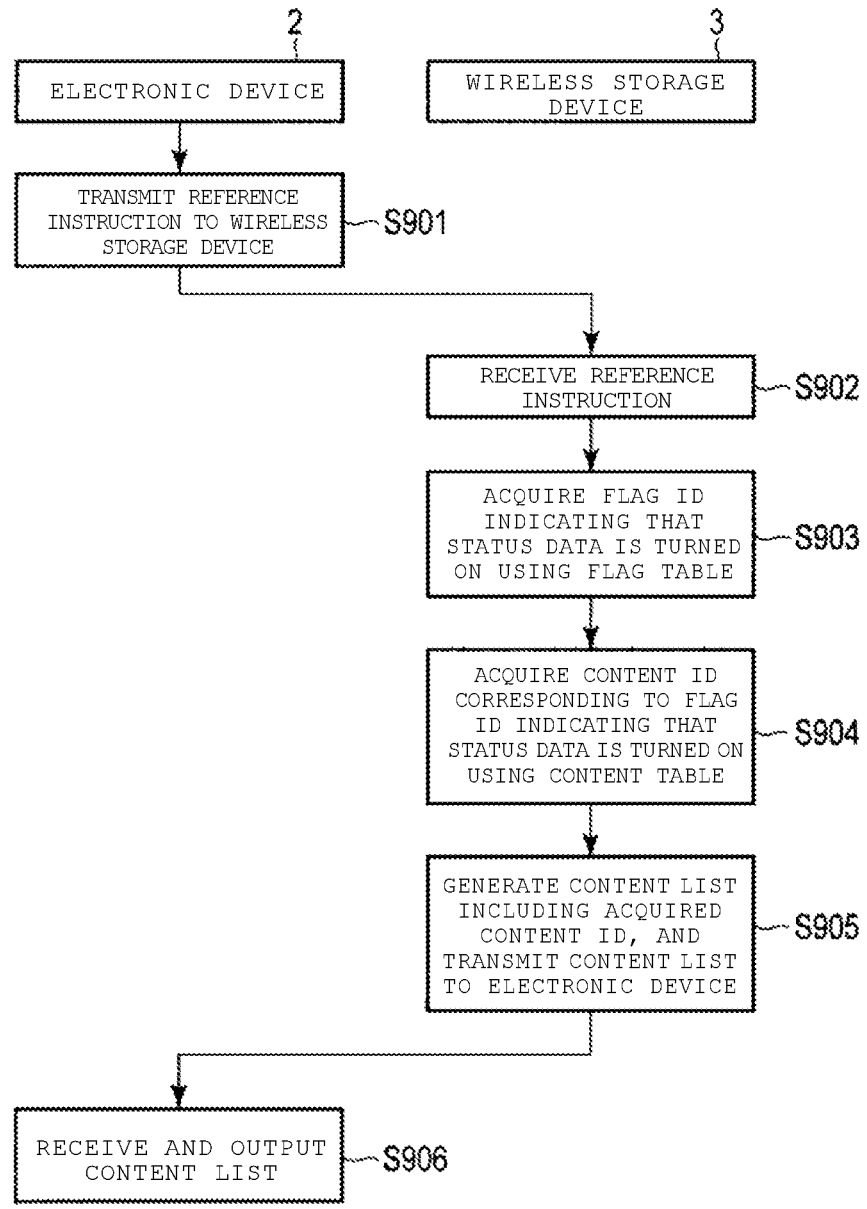
FIG. 9 is a flowchart showing a content list outputting process according to the first embodiment.

FIG. 9 is a flowchart showing a content list outputting process according to the present embodiment.

In the present embodiment, it is assumed that a content list is data including the content IDs of the contents which are allowed to be read of the content IDs 101-1 to 101-n stored in the non-volatile memory 32. For example, the content list may be a list of file names capable of being read from the non-volatile memory 32.

FIG. 9 shows a process from when the wireless storage device 3 is attached to the attachment unit 22 of the electronic device 2 to when the operation control unit 21 of the electronic device 2 outputs the content list.

In step S901, the operation control unit 21 of the electronic device 2 transmits a reference instruction to the wireless storage device 3 via the attachment unit 22. The electronic device 2 may transmit an instruction to acquire the content list to the wireless storage device 3 via the attachment unit 22.

In step S902, the controller 33 of the wireless storage device 3 receives the reference instruction or the content acquisition instruction from the electronic device 2 via the connection unit 38.

In step S903, the controller 33 reads the flag table 105 stored in the wireless communication memory 36 via the communication controller 34, and acquires the flag ID (the flag ID is read) indicating that the status data is turned on.

In step S904, the controller 33 reads the content table 103 stored in the wireless communication memory 36 via the communication controller 34. The controller 33 acquires the content ID (the content ID of the content is allowed to be read) corresponding to the flag ID indicating that the status data is turned on based on the read content table 103 and the flag ID acquired in step S903.

In step S905, the controller 33 generates the content list including the content ID acquired in step S904, and transmits the generated content list to the electronic device 2 via the connection unit 38.

In step S906, the operation control unit 21 of the electronic device 2 receives the content list from the wireless storage device 3 via the attachment unit 22, and outputs (for example, displays) the received content list.

In the present embodiment, if the table acquired by associating the content ID with the status data 1053 is used, a step of acquiring the content ID indicating that the status data is turned on may be performed instead of step S903 and step S904.

In the present embodiment, the content list may be generated by the operation control unit 21 of the electronic device 2. In this case, in step S906, the operation control unit 21 of the electronic device 2 transmits an instruction to read the content ID to the non-volatile memory 32 via the attachment unit 22 of the wireless storage device 3 and the controller 33. The controller 33 allows reading of the content ID corresponding to the flag ID indicating that the status data is turned on, and disallows reading of the content ID other than the allowed content ID. The operation control unit 21 of the electronic device 2 receives the content IDs allowed to be read by the controller 33, generates the content list, and outputs the generated content list.

In the present embodiment described above, the controller 33 manages whether to allow or disallow reading of the contents 102 stored in the non-volatile memory 32 by using the flag table 105 acquired by associating the flag ID 1052 with the status data 1053 and the content table 103 acquired by associating the flag ID 1032 with the content ID 1033 which are stored in the wireless communication memory 33. Accordingly, for example, the information processing device 4 changes the status data 1053 of the flag table 105 by performing wireless communication with the wireless storage device 3, and thus, it is possible to reveal or conceal the contents 102-1 to 102-n stored in the non-volatile memory 32 to the user.

The present embodiment may be applied to, for example, a stamp rally. Specifically, for example, the user moves with the wireless storage device 3, and places the wireless storage device 3 over the plurality of information processing devices 4 installed in different locations. Accordingly, wireless communication is performed between the wireless storage device 3 and the plurality of information processing devices 4. The status data 1053 of the flag table 105 of the wireless communication memory 36 of the wireless storage device 3 is updated through wireless communication, and the contents corresponding to the plurality of information processing devices 4 can be read.

For example, the present embodiment may be applied to various check operations performed by the user using the information processing device 4. Specifically, for example, the user places the wireless storage device 3 over a predetermined information processing device 4. If the wireless storage device 3 is placed over the predetermined information processing device 4 a predetermined number of times and wireless communication is performed between the wireless storage device 3 and the plurality of information processing devices 4 a predetermined number of times, the status data 1053 of the flag table 105 is updated, and the content indicating that the plurality of check operations is completed is allowed to be read. In this case, the electronic device 2 may output the content, and may notify the user of the completion of the check operation.

Second Embodiment

In the present embodiment, a modification example of the information processing system 1 according to the first embodiment will be described.

In the present embodiment, the communication controller 34 receives the flag information from the information processing device 4 via the wireless antenna 31, and stores the received flag information in the wireless communication memory 36. The communication controller 34 also transmits the flag information to the information processing device 4 via the wireless antenna 31.

The information processing device 4 receives the flag information from the wireless storage device 3 through wireless communication, determines whether to allow or disallow reading of the content based on the received flag information, and transmits acquisition information used for acquiring the content to the storage device through wireless communication if the reading of the content is allowed. For example, the acquisition information is location information where the content is stored. In the present embodiment, a uniform resource locator (URL) is used as the acquisition information.

The communication controller 34 receives the URL from the information processing device 4 via the wireless antenna 31, and stores the received URL in the wireless communication memory 36.

The electronic device 2 reads a program (an automatic execution program 106 of FIG. 10) stored in the non-volatile memory 32 via the memory controller 35, the controller 33, and the connection unit 38, and executes the automatic execution program 106. For example, if the non-volatile memory 32 is attached to the electronic device 2, the automatic execution program 106 is preferably set so as to be automatically executed by the electronic device 2 without requiring the operation of the user. The electronic device 2 controlled by the automatic execution program 106 reads the URL stored in the wireless communication memory 36 via the communication controller 34, the controller 33, and the connection unit 38, and stores the content acquired based on the read URL in the non-volatile memory 32 via the connection unit 38, the controller 33, and the memory controller 35.

Figure 10:
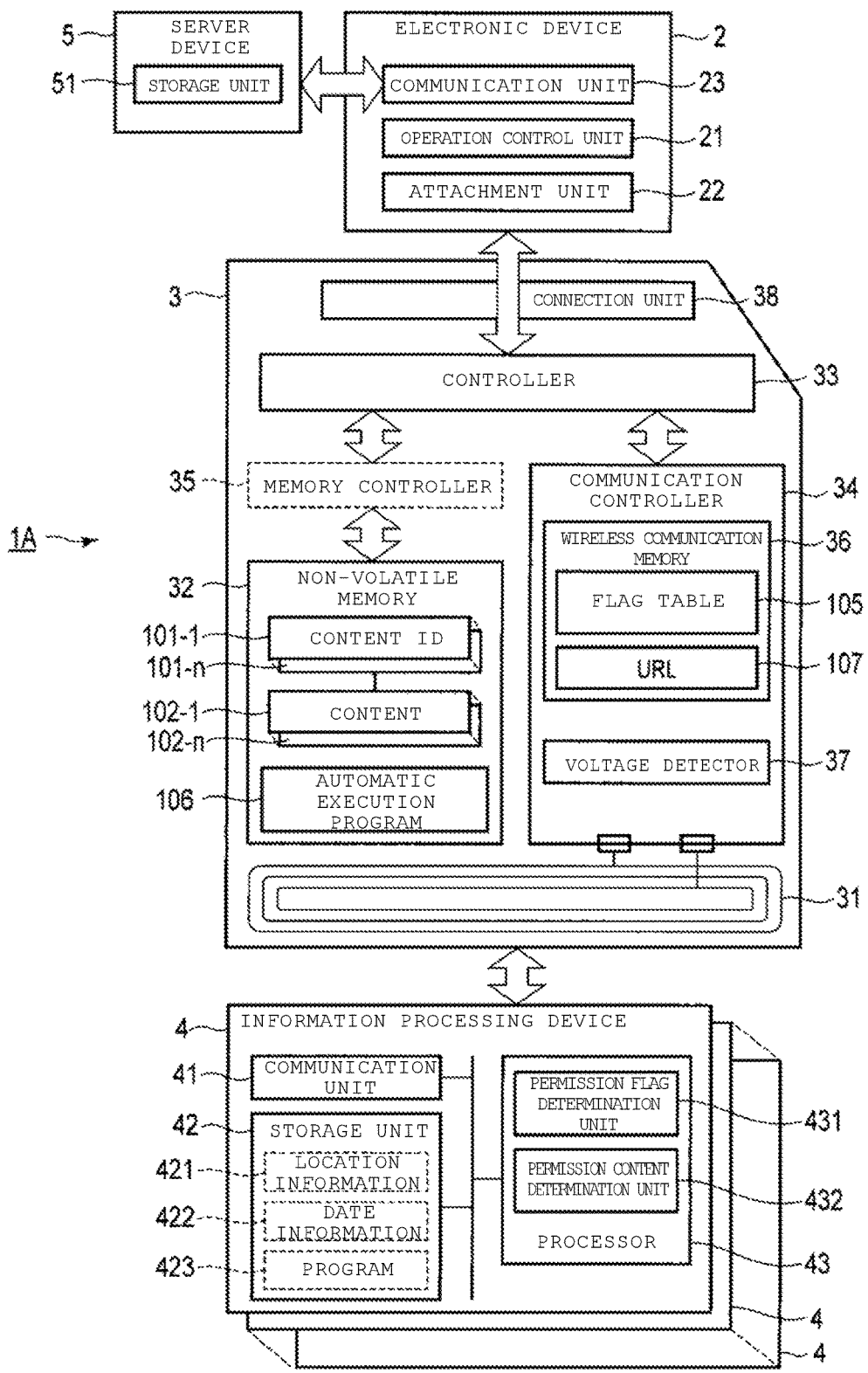
FIG. 10 is a block diagram showing an example of a configuration of an information processing system according to a second embodiment.

FIG. 10 is a block diagram showing an example of a configuration of an information processing system 1A according to the present embodiment. Hereinafter, differences between the information processing system 1A according to the present embodiment and the information processing system 1 according to the first embodiment will be described.

The information processing system 1A further includes a server device 5.

The server device 5 transmits or receives a command, an address, data, information, an instruction, a signal, content, or a content ID to or from the electronic device 2 in a wireless or wired manner. For example, a wireless communication standard such as a wireless LAN, the 3rd generation (3G), or Long-Term Evolution (LTE) may be used as the communication between the electronic device 2 and the server device 5.

The server device 5 includes a storage unit 51.

For example, the storage unit 51 stores the content ID and the content capable of being reproduced in the electronic device 2. If the electronic device 2 is plural in number, the storage unit 51 may store the contents and the content IDs in storage areas divided for the electronic devices 2.

The electronic device 2 further includes a communication unit 23.

The communication unit 23 transmits or receives a command, an address, data, information, an instruction, a signal, content, or a content ID to or from the server device 5 in a wireless or wired manner.

The wireless communication memory 36 includes a flag table 105, and a URL 107. For example, the URL 107 indicates the content stored in the storage unit 51 of the server device 5.

The non-volatile memory 32 includes the automatic execution program 106.

If the wireless storage device 3 is attached to the attachment unit 22 of the electronic device 2, the automatic execution program 106 is read and executed by the operation control unit 21 of the electronic device 2 from the non-volatile memory 32 via the memory controller 35, the controller 33, the connection unit 38, and the attachment unit 22. If the automatic execution program 106 is executed by the operation control unit 21 of the electronic device 2, this program causes the electronic device to read the URL 107 stored in the wireless communication memory 36 via the communication controller 34, the controller 33, the connection unit 38 and the attachment unit 22, to communicate with the server device 5 via the communication unit 23 based on the read URL 107, and to read (downloads) the content and the content ID from the server device 5. The automatic execution program 106 causes the electronic device to store the content and the content ID read from the server device 5 in the non-volatile memory 32 via the attachment unit 22, the connection unit 38 of the wireless storage device 3, the controller 33, and the memory controller 35.

The automatic execution program 106 may function as a part of an operating system (OS) of the electronic device 2, or may be, for example, an application program controlled by the OS.

In the present embodiment, for example, it is assumed that the operation control unit 21 executes the automatic execution program 106. However, a processor (not shown) different from the operation control unit 21 may execute the automatic execution program 106.

The information processing device 4 further includes a permission content determination unit 432. For example, the processor 43 functions as the permission flag determination unit 431 and the permission content determination unit 432 by executing the program 423 stored in the storage unit 42.

The permission content determination unit 432 newly determines the content to be stored in the non-volatile memory 32 based on the status data of the flag table 105 received from the wireless storage device 3 via the communication unit 41, and stores the URL 107 of the content in the wireless communication memory 36 via the communication unit 41, the wireless antenna 31, and the communication controller 34.

In the present embodiment, if the content is newly stored in the non-volatile memory 32, the permission content determination unit 432 may allow or disallow the reading of the newly stored content. Whether to allow or disallow the reading of the newly stored content may be switched by changing the status data 1053 of the flag table 105 stored in the wireless communication memory 36.

For example, the permission content determination unit 432 may determine whether or not to store new contents in the non-volatile memory 32 depending on whether or not all the status data items corresponding to the content IDs indicating the new contents are turned on. For example, the permission content determination unit 432 may determine whether or not to store the new contents in the non-volatile memory 32 by using an arbitrary combination of the flag ID 1052, the status data 1053, the number-of-times data 1054, the date and time data 1055, and the location data 1056 included in the flag table 105a or the flag table 105b, or another condition.

The permission content determination unit 432 determines the URL 107 of the new content. For example, in the determination of the URL 107, the permission content determination unit 432 may stores information (not shown) acquired by associating the content ID indicating the content with the URL 107 of the content in the storage unit 42, and may determine the URL 107 of the new content based on the information. For example, the permission content determination unit 432 may acquire the URL 107 of the new content from a website (not shown) via the communication unit 41.

Figure 11:
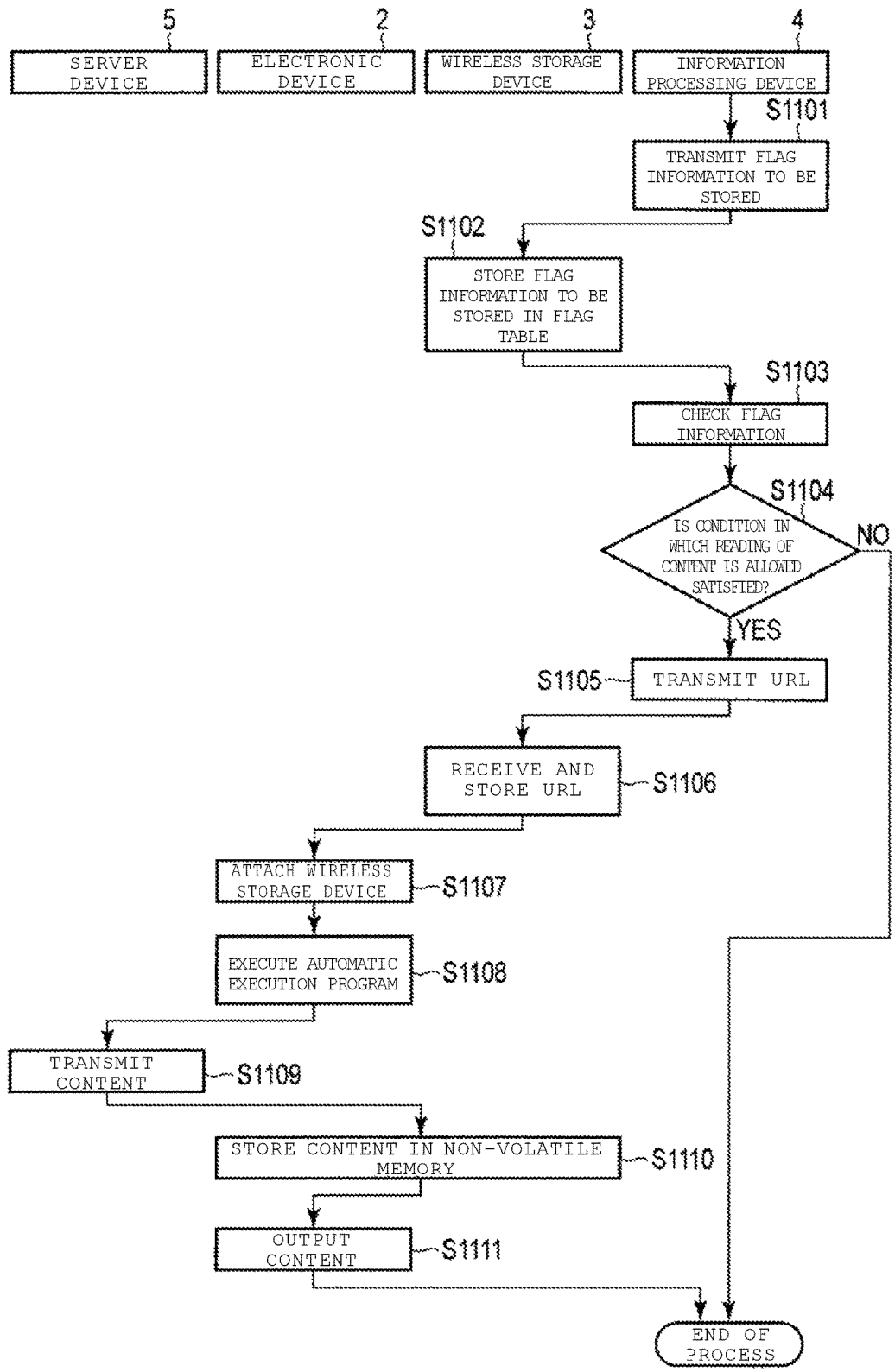
FIG. 11 is a flowchart showing a process of storing new content in a non-volatile memory according to the second embodiment.

FIG. 11 is a flowchart showing a process of storing the new content in the non-volatile memory 32 according to the present embodiment.

In step S1101, the permission flag determination unit 431 of the information processing device 4 performs wireless communication with the wireless storage device 3 via the communication unit 41, and reads the flag information which is a part or the whole of the flag table 105 of the wireless communication memory 36. The permission flag determination unit 431 determines the flag information to be stored based on the read flag information. The permission flag determination unit 431 transmits the flag information to be stored to the wireless storage device 3 via the communication unit 41.

In step S1102, the communication controller 34 of the wireless storage device 3 receives the flag information to be stored and an instruction to store the flag information from the information processing device 4 via the wireless antenna 31, and stores the received flag information to be stored in the flag table 105 of the wireless communication memory 36. Accordingly, the flag table 105 is updated.

The processes performed in steps S1101 and S1102 are the same as the processes performed in steps S501 to S503 of FIG. 5.

In step S1103, the permission content determination unit 432 of the information processing device 4 performs wireless communication with the wireless storage device 3 via the communication unit 41, receives flag information at a current point of time included in the flag table 105 of the wireless communication memory 36, and checks the received flag information.

In step S1104, the permission content determination unit 432 determines whether or not the flag information satisfies the condition in which one or more contents can be read. Specifically, for example, the permission content determination unit 432 determines whether or not values such as the flag ID 1051, the status data 1053, the number-of-times data 1054, the date and time data 1055, and the location data 1056 included in the flag information received from the flag table 105a or 105b of the wireless communication memory 36 via the communication controller 34, the wireless antenna 31 and the communication unit 41 satisfy the condition in which the reading of the content is allowed.

For example, the condition in which the reading of the content is allowed may be previously stored in the storage unit 42. For example, the permission content determination unit 432 may acquire the condition in which the reading of the content is allowed from a website (not shown) via the communication unit 41.

If the received flag information does not satisfy the condition in which the reading of the content is allowed, the process is ended.

If the received flag information satisfies the condition in which the reading of the content is allowed, the process proceeds to step S1105.

In step S1105, the permission content determination unit 432 transmits the URL 107 of the content which satisfies the condition in which the reading thereof is allowed to the wireless storage device 3 via the communication unit 41. If there is a plurality of contents that satisfies the condition in which the reading thereof is allowed, the permission content determination unit 432 may transmit a plurality of URLs 107 corresponding to the plurality of contents that satisfies the condition in which the reading thereof is allowed to the wireless storage device 3 via the communication unit 41.

In step S1106, the communication controller 34 of the wireless storage device 3 receives the URL 107 from the information processing device 4 via the wireless antenna 31 through wireless communication, and stores the received URL 107 in the wireless communication memory 36.

In step S1107, the wireless storage device 3 is attached to the attachment unit 22 of the electronic device 2. The wireless storage device 3 may be previously attached to the attachment unit 22 of the electronic device 2, or the wireless storage device 3 may be attached to the attachment unit at an arbitrary timing of step S1101 to S1107.

In step S1108, the operation control unit 21 of the electronic device 2 transmits an instruction to read the automatic execution program 106 stored in the non-volatile memory 32 to the controller 33 of the wireless storage device 3 via the attachment unit 22 and the connection unit 38. The controller 33 reads the automatic execution program 106 via the non-volatile memory 32, and transmits the read automatic execution program 106 to the operation control unit 21 via the connection unit 38 and the attachment unit 22. If the automatic execution program 106 is received, the operation control unit 21 executes the received automatic execution program 106. The operation control unit 21 transmits an instruction to read the URL 107 stored in the wireless communication memory 36 to the controller 33 of the wireless storage device 3 via the attachment unit 22 and the connection unit 38 under the control of the automatic execution program 106. The controller 33 reads the URL 107 stored in the wireless communication memory 36 via the communication controller 34, and transmits the read URL 107 to the operation control unit 21 via the connection unit 38 and the attachment unit 22 according to the received read instruction of the URL 107. The operation control unit 21 receives the URL 107 from the wireless storage device 3 via the attachment unit 22.

In step S1109, the operation control unit 21 transmits an instruction to read the content indicated by the received URL 107 to the server device 5 via the communication unit 23. The server device 5 reads new content and content ID indicated by the URL 107 from the storage unit 51, and transmits the read new content and content ID to the electronic device 2.

In step S1110, if the new content and content ID are received from the server device 5 via the communication unit 23, the operation control unit 21 of the electronic device 2 transmits a storage instruction corresponding to the new content and content ID to the controller 33 via the attachment unit 22 and the connection unit 38 under the control of the automatic execution program 106. The controller 33 of the wireless storage device 3 stores the new content and content ID in the non-volatile memory 32 via the memory controller 35 according to the received storage instruction.

In step S1111, the operation control unit 21 reads the content stored in the non-volatile memory 32 in step S1110 via the memory controller 35, the controller 33, the connection unit 38, and the attachment unit 22, and outputs (for example, reproduces) the read content. The content outputting process is the same as the process of FIG. 8.

If the attachment unit 22 of the electronic device 2 is attached to the wireless storage device 3 before step S1106, a timing when the operation control unit 21 of the electronic device 2 executes the automatic execution program 106 may be, for example, a timing when the URL 107 is stored in the wireless communication memory 36.

In the present embodiment described above, the information processing device 4 determines the content to be newly stored in the non-volatile memory 32 by using the flag information received from the wireless storage device 3, and transmits the URL 107 of the content to the wireless storage device 3. The wireless storage device 3 stores the URL 107 received from the information processing device 4 in the wireless communication memory 36. The electronic device 2 reads the URL 107 stored in the wireless communication memory 36, reads the new content from the server device 5 based on the read URL 107, and additionally stores the new content in the non-volatile memory 32 of the wireless storage device 3, by reading the automatic execution program 106 stored in the non-volatile memory 32 of the wireless storage device 3 and executing the read program. Accordingly, for example, the user allows the wireless storage device 3 and the information processing device 4 to wirelessly communicate with each other, and thus, it is possible to additionally store the new content in the non-volatile memory 32 if a predetermined condition is satisfied. Similarly to the first embodiment, the present embodiment may be applied to, for example, a stamp rally or a check operation.

In the present embodiment, the type of the electronic device ID 1051 or the flag ID 1052 included in the flag table 105 may be added by the information processing device 4. For example, the automatic execution program 106 may be stored in another memory different from the non-volatile memory 32 such as the wireless communication memory 36.

Third Embodiment

In the present embodiment, a modification example of the information processing systems 1 and 1A according to the first and second embodiments will be describe.

In the present embodiment, an information processing system that includes a wireless storage device, a first communication device to which the wireless storage device can be attached, and a second communication device which performs wireless communication with the wireless storage device or the first communication device will be described. In the present embodiment, the wireless storage device allows or disallows reading of the non-volatile memory provided in the wireless storage device. A state in which the reading from the non-volatile memory is allowed is a state in which an access to the non-volatile memory is unlocked. A state in which only the reading from the non-volatile memory is disallowed is a state in which the access to the non-volatile memory is locked.

The first communication device may be a station, and the second communication device may be an access point. In contrast, the first communication device may be an access point, and the second communication device may be a station.

In the present embodiment, the wireless storage device may be a station, or may be an access point. If the wireless storage device is an access point, both the first communication device and the second communication device may be stations.

In the present embodiment, the access point is, for example, a device or a terminal having a function causing a plurality of devices or terminals having a wireless communication function to communication with each other.

In the present embodiment, the station is, for example, a device or a terminal wirelessly connected by the access point.

For example, if the wireless storage device is the station, the wireless storage device receives a wireless communication ID issued by the access point, and performs authentication by using the received wireless communication ID and an authentication wireless communication ID stored in the non-volatile memory of the wireless storage device. For example, if the authentication succeeds, the wireless storage device receives a radio wave corresponding to the wireless communication ID, and allows reading of the non-volatile memory of the wireless storage device. For example, if the authentication fails, the wireless storage device disallows reading of the non-volatile memory of the wireless storage device.

For example, if the wireless storage device is the access point, the wireless storage device transmits the radio wave corresponding to the wireless communication ID, and performs wireless communication with the station allowed to be connected to a wireless communication network indicated by the wireless communication ID.

Figure 12:
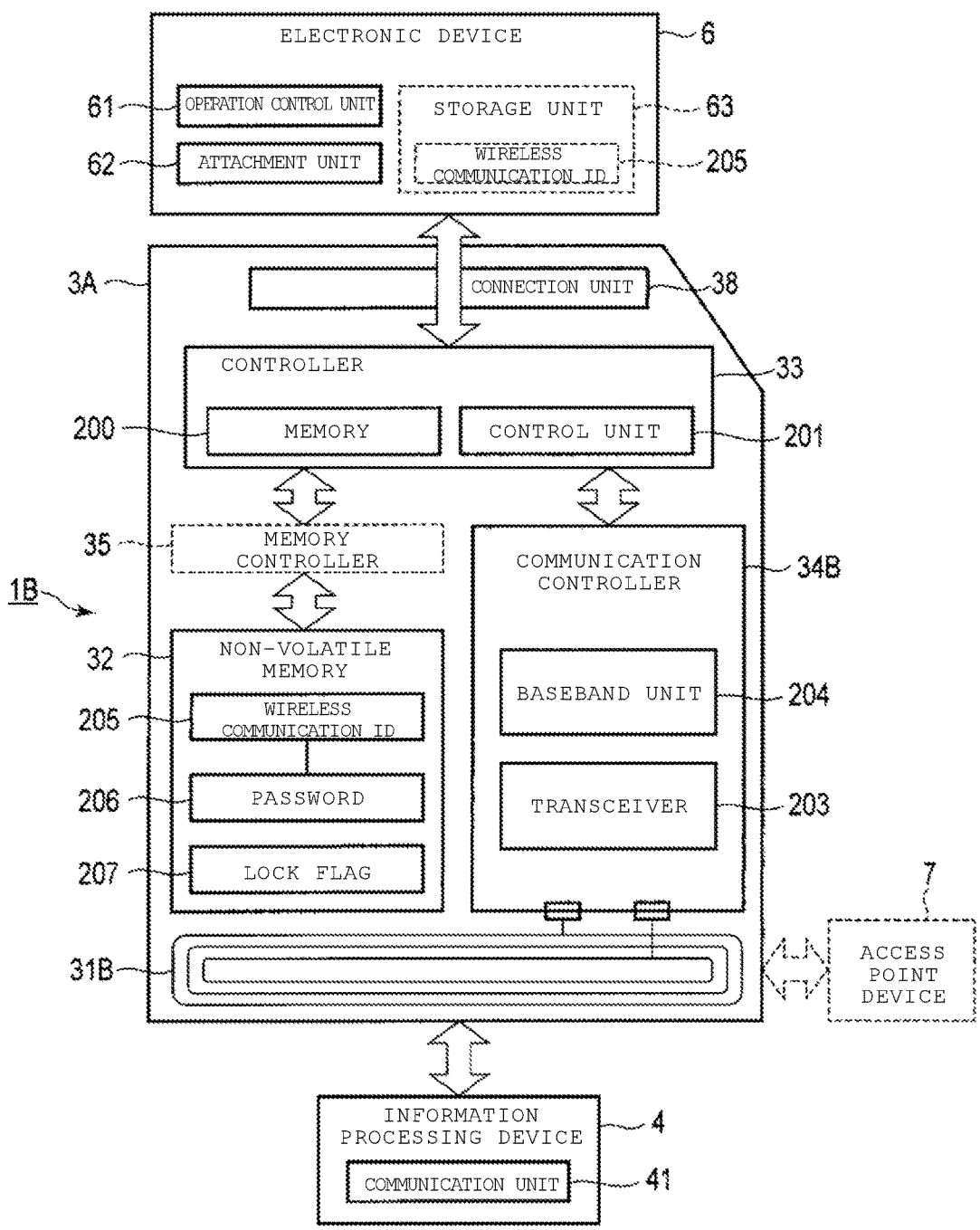
FIG. 12 is a block diagram showing an example of a configuration of an information processing system according to a third embodiment.

FIG. 12 is a block diagram showing an example of a configuration of an information processing system 1B according to the present embodiment. Hereinafter, differences between the information processing system 1B according to the present embodiment, the information processing system 1 according to the first embodiment, and the information processing system 1A according to the second embodiment will be described.

The information processing system 1B includes an electronic device 6, a wireless storage device 3A, an information processing device 4, and an access point device 7.

In the present embodiment, for example, it is assumed that the information processing device 4 is the station if the wireless storage device 3A is the access point. In this case, the access point device 7 may not be included in the information processing system 1B. If the wireless storage device 3A is the station, it is assumed that the information processing device 4 is the access point. If the wireless storage device 3A is the station, the information processing system 1B includes at least one of the access point device 7 and the information processing device 4 as the access point.

The electronic device 6 includes an operation control unit 61, and an attachment unit 62.

The operation control unit 61 has the same function as that of the operation control unit 21 described in the first and second embodiments. For example, if the wireless storage device 3A is attached to the attachment unit 62, the operation control unit 61 supplies a power to the wireless storage device 3A.

For example, if the electronic device 6 has a wireless communication function, the operation control unit 61 is connected to the access point device 7, receives the wireless communication ID from the access point device 7, performs unlock determination of the access to the wireless storage device 3A, and transmits an instruction to unlock the access to the wireless storage device 3A. The electronic device 6 may include the storage unit 63. The storage unit 63 may include a wireless communication ID 205 to be described below.

The attachment unit 62 is equivalent to the attachment unit 22 described in the first and second embodiments.

The wireless storage device 3A includes, a wireless antenna 31B, a non-volatile memory 32, a controller 33, a communication controller 34B, a memory controller 35, and a connection unit 38.

The communication controller 34B includes, for example, a transceiver 203, and a baseband unit 204.

Similarly to the first embodiment, the controller 33, the communication controller 34B, and the memory controller 35 may be freely combined or may be separated. For example, the baseband unit 204 may be included in the controller 33. The transceiver 203 may be separated from the controller 33.

In the present embodiment, a case where the wireless communication performed by the wireless storage device 3A, the access point device 7, and the information processing device 4 is a wireless local area network (LAN) will be described. However, the wireless communication may be wireless communication conformable to Bluetooth®, TransferJet®, or another standard. In this case, for example, the communication controller 34B and the wireless antenna 31B are conformable to another wireless communication standard.

Although the wireless storage device 3A transmits or receives data to or from the electronic device 6 via the connection unit 38 through the wired interface such as the SD interface in the present embodiment, another interface may be used.

For example, the wireless antenna 31B receives a radio wave from the access point device 7, converts the received radio wave into an electrical signal, and transmits the electrical signal to the communication controller 34B. The wireless antenna 31B converts the electrical signal generated by the transceiver 203 of the communication controller 34B.

For example, it is assumed that a frequency band at which the wireless antenna 31B can operate is a predetermined frequency band corresponding to the wireless LAN standard.

The communication controller 34B performs control required in a case where the wireless storage device 3A performs wireless communication.

For example, at the time of the wireless communication with the access point device 7, the communication controller 34B receives the wireless communication ID issued by the access point device 7 via the wireless antenna 31B, and transmits the received ID to the controller 33. At the time of the wireless communication, the communication controller 34B transmits or receives a command, an address, data, information, an instruction, or a signal to or from a device as a communication partner via the wireless antenna 31B.

At the time of the wireless communication, the transceiver 203 of the communication controller 34B demodulates the electrical signal received by the wireless antenna 31B into a baseband signal. At the time of the wireless communication, the transceiver 203 modulates the baseband signal received by the baseband unit 204 into the electrical signal. For example, the baseband signal indicates digital data which is not modulated yet or is already demodulated. For example, the digital data may be a command, an address, data, information, an instruction, or a signal. For example, the modulation of the baseband signal into the electrical signal or the demodulation of the electrical signal into the baseband signal is performed according to the wireless LAN standard.

At the time of the wireless communication, the baseband unit 204 performs signal processing on the signal demodulated by the transceiver 203 or the digital data which is received by the controller 33 and is not modulated yet by the transceiver 203. For example, the signal processing may be noise reduction, or addition or deletion of an error correcting code.

For example, the non-volatile memory 32 stores the wireless communication ID 205, a password 206, and a lock flag 207. The wireless communication ID 205, the password 206, and the lock flag 207 are preferably stored in a concealed area (an area that the user is defined from reading) of the non-volatile memory 32.

The wireless communication ID 205 and the password 206 are a wireless communication ID for use in unlock authentication and a password required to be connected to the wireless communication network using the wireless communication ID in the process of unlocking the access to the non-volatile memory 32, which is performed by the controller 33.

For example, the wireless communication ID 205 and the password 206 are stored in the non-volatile memory 32 so as to be associated with each other.

For example, the wireless communication ID 205 and the password 206 are preferably stored in the non-volatile memory 32 in advance. The wireless communication ID 205 and the password 206 may be set by the user.

The non-volatile memory 32 may include a plurality of wireless communication IDs, and a plurality of passwords which respectively corresponds to the plurality of wireless communication IDs.

The lock flag 207 is information indicating whether or not the access to the non-volatile memory 32 is locked, that is, whether or not the reading from the non-volatile memory 32 is allowed. The lock flag 207 may be data of 1 bit, or may be data of 2 bits or more. Hereinafter, a state in which the access to the non-volatile memory 32 is locked is represented as on, and a state in which the access to the non-volatile memory 32 is unlocked is represented as off. Although the permission or refusal to read from the non-volatile memory 32 is switched in the present embodiment, the permission or refusal to write in the non-volatile memory 32 may also be switched.

The controller 33 locks or unlocks the access to the non-volatile memory 32.

Specifically, for example, if the wireless storage device 3A is the station, the controller 33 receives the wireless communication ID from the access point device 7 or the information processing device 4 which is the access point via the wireless antenna 31B and the communication controller 34B. The controller 33 performs authentication by comparing the received wireless communication ID with the wireless communication ID 205 read from the non-volatile memory 32 via the memory controller 35.

If the authentication succeeds, the controller 33 sets the lock flag 207 stored in the non-volatile memory 32 to be off via the memory controller 35. Accordingly, the access of the wireless storage device 3A to the non-volatile memory 32 is unlocked.

If the authentication fails or if the radio wave corresponding to the wireless communication ID is not able to be received, the controller 33 sets the lock flag 207 stored in the non-volatile memory 32 via the memory controller 35 to be on. Accordingly, the access of the wireless storage device 3A to the non-volatile memory 32 is locked.

For example, if the wireless storage device 3A is the access point, the controller 33 transmits the radio wave including the wireless communication ID to the station (for example, the information processing device 4) capable of performing wireless communication with the wireless storage device 3A by using the communication controller 34B and the wireless antenna 31B. If the access point and the station can perform the wireless communication, the access point and the station share, for example, the same wireless communication ID. If there is the station capable of performing the wireless communication, the controller 33 provided in the wireless storage device 3A which is the access point sets the lock flag 207 stored in the non-volatile memory 207 to be off via the memory controller 35. If there is no station capable of performing the wireless communication, the controller 33 provided in the wireless storage device 3A which is the access point sets the lock flag 207 stored in the non-volatile memory 207 via the memory controller 35 to be on. The details of the unlocking process and the locking process will be described below with reference to FIGS. 13 to 15.

If the instruction to read in the non-volatile memory 32 is received from the electronic device 6 via the connection unit 38, the controller 33 reads the lock flag 207 from the non-volatile memory 32 via the memory controller 35, and checks the lock flag 207. For example, the controller 33 performs lock control so as to disallow reading of the non-volatile memory 32 if the lock flag 207 is turned on and to allow reading of the non-volatile memory 32 if the lock flag 207 is turned off.

For example, the wireless communication ID 205, the password 206, and the lock flag 207 stored in the non-volatile memory 32 may be included in another memory such as a memory (not shown) included in the controller 33 which is different from the non-volatile memory 32.

For example, the access point device 7 operates as the access point of the wireless LAN. However, the access point device 7 may operate as the access point of the wireless communication conformable to another standard.

The access point device 7 issues the wireless communication ID. For example, the wireless communication ID may be a service set identifier (SSID: identifier of an access point) in the wireless LAN. The wireless communication ID may be information regarding an ID of wireless communication or the wireless communication in another wireless communication standard.

In the present embodiment, for example, the access point device 7 transmits a radio wave of a wireless LAN standard to which the SSID is assigned. If the wireless storage device 3A is the station, the wireless antenna 31B of the wireless storage device 3A receives the radio wave transmitted from the access point device 7. The radio wave received by the wireless antenna 31B passes through the transceiver 203 and the baseband unit 204 of the communication controller 34B, is converted into digital data, and is transmitted to the controller 33. The controller 33 recognizes the SSID included in the digital data, and performs the unlocking process or the locking process of the access to the non-volatile memory 32.

If the information processing device 4 is the access point, the communication unit 41 of the information processing device 4 transmits the radio wave to which the wireless communication ID is assigned. If the wireless storage device 3A is the access point, the communication controller 34 of the wireless storage device 3A transmits the radio wave to which the wireless communication ID is assigned by using the wireless antenna 31B.

FIG. 13 is a flowchart showing an example of the unlocking process and the locking process if the wireless storage device 3A according to the present embodiment is the station.

In step S1301, the wireless storage device 3A is attached to the attachment unit 62 of the electronic device 6. The operation control unit 61 supplies the power to the wireless storage device 3A attached to the attachment unit 62.

In step S1302, the communication controller 34B of the wireless storage device 3A searches for the radio wave transmitted from the access point. The access point may the access point device 7 or the information processing device 4. The communication controller 34B of the wireless storage device 3A acquires the SSID from the received radio wave via the wireless antenna 31B, and transmits the acquired SSID to the controller 33.

In step S1303, the controller 33 reads the wireless communication ID 205 stored in the non-volatile memory 32 via the memory controller 35, and compares the read wireless communication ID 205 with the SSID acquired in step S1302. If the read wireless communication ID 205 matches to the acquired SSID, the process proceeds to step S1304. If the read wireless communication ID 205 does not match to the acquired SSID, the process proceeds to step S1306.

If the password is not required at the time of the connection to the wireless communication network corresponding to the acquired SSID, the controller 33 may read the password 206 associated with the wireless communication ID 205 stored in the non-volatile memory 32 via the memory controller 35, and may be connected to the wireless communication network by using the read password 206. The connection to the wireless communication network corresponding to the acquired SSID may be performed in step S1302.

In step S1304, the controller 33 performs the unlocking process. Specifically, the controller 33 sets the lock flag 207 stored in the non-volatile memory 32 to be off via the memory controller 35. For example, if the instruction to read from the non-volatile memory 32 is received from the electronic device 6 via the connection unit 38, the controller 33 reads the lock flag 207 stored in the non-volatile memory 32 via the memory controller 35, and allows reading of the non-volatile memory 32 if it is checked that the read lock flag 207 is turned off. Accordingly, the access to the non-volatile memory 32 is unlocked.

The controller 33 may return to step S1303 after step S1304. After step S1304, the electronic device 6 performs step S1305.

In step S1305, the operation control unit 21 of the electronic device 6 performs a process such as stopping of power supply if the wireless storage device 3A is detached from the attachment unit 62 of the electronic device 6. The wireless storage device 3A may be detached by the user at an arbitrary timing. Thereafter, the process proceeds to step S1306.

In step S1306, the controller 33 of the wireless storage device 3A performs the locking process. Specifically, the controller 33 sets the lock flag 207 stored in the non-volatile memory 32 to be on via the memory controller 35. For example, if the instruction to read from the non-volatile memory 32 is received from the electronic device 6 via the connection unit 38, the controller 33 reads the lock flag 207 stored in the non-volatile memory 32 via the memory controller 35, and disallows reading of the non-volatile memory 32 if it is checked that the read lock flag 207 is turned on. Accordingly, the access to the non-volatile memory 32 is locked.

In step S1306, even though the supply of the power to the wireless storage device 3A from the electronic device 6 is stopped, the wireless storage device 3A may perform the locking process with the power stored in a capacitor provided in the wireless storage device 3A.

In the present embodiment, the controller 33 may periodically perform the process of step S1303. That is, the controller 33 may periodically compares the acquired SSID with the wireless communication ID 205 read from the non-volatile memory 32 via the memory controller 35, may perform the locking process if both the SSID and the wireless communication ID do not match to each other, and may perform the unlocking process if both the SSID and the wireless communication ID match to each other. Accordingly, the access to the non-volatile memory 32 of the wireless storage device 3A is automatically locked and unlocked.

For example, the unlocking process of step S1304 may be performed at an arbitrary timing designated by the user. For example, the user performs an input indicating that the unlocking is performed in the electronic device 6 to which the wireless storage device 3A is already attached. The operation control unit 61 of the electronic device 6 transmits the unlock instruction to the controller 33 via the attachment unit 62 and the connection unit 38. If the unlock instruction is received, the controller 33 sets the lock flag 207 stored in the non-volatile memory 32 to be off via the memory controller 35. Accordingly, if the wireless storage device 3A is connected to the wireless communication network corresponding to the wireless communication ID 205 stored in the non-volatile memory 32, the user can lock and unlock the access to the non-volatile memory 32 of the wireless storage device 3A at an arbitrary timing.

FIG. 14 is a flowchart showing an example of the unlocking process and the locking process if the wireless storage device 3A according to the present embodiment is the access point.

Step S1401 is the same as step S1301 of FIG. 13.

In step S1402, the communication controller 34B of the wireless storage device 3A transmits the radio wave including the SSID.

In step S1403, the communication unit 41 of the information processing device 4 searches for the radio wave transmitted from the wireless storage device 3A. The communication unit 41 acquires the SSID from the radio wave, and is connected to the wireless communication network corresponding to the acquired SSID.

In step S1404, the communication controller 34B of the wireless storage device 3A checks whether or not there is the station being connected to the wireless communication network using the wireless storage device 3A as the access point. For example, the communication controller 34B may check whether or not there is the station being connected to the wireless communication network using the wireless storage device 3A as the access point by whether or not the command and the data are transmitted or received from the station, the comparison of the station with a hash value, or another method. If there is the station being connected to the wireless communication network using the wireless storage device 3A as the access point, the process proceeds to step S1405. If there is no station being connected to the wireless communication network using the wireless storage device 3A as the access point, the process proceeds to step S1407.

The processes from step S1405 to step S1407 are the same as those from step S1304 to step S1306 of FIG. 13.

Hereinafter, a modification example of the present embodiment will be described.

FIG. 15 is a flowchart showing a modification example of the unlocking process and the locking process according to the present embodiment. In FIG. 15, a case where the electronic device 6 is the station and the information processing device 4 is the access point is illustrated. However, in contrast, the electronic device 6 may be the access point, and the information processing device 4 may be the station. In the example of FIG. 15, the electronic device 6 preferably has the same configuration as that of the communication controller 34B and the wireless antenna 31B. In the example of FIG. 15, the wireless communication ID 205 is preferably stored in, for example, the memory included in the electronic device 6. In the example of FIG. 15, a storage device 3B may not have the wireless communication function. As stated above, if the storage device 3B does not need to have the wireless communication function, the storage device 3B may include the connection unit 38, the memory controller 35, and the non-volatile memory 32, but may not include the controller 33, the communication controller 34B, and the wireless antenna 31B.

In step S1501, the storage device 3B is attached to the attachment unit 62 of the electronic device 6. The operation control unit 61 supplies a power to the storage device 3B attached to the attachment unit 62.

In step S1502, the operation control unit 61 of the electronic device 6 searches for the radio wave transmitted from the information processing device 4 which is the access point, acquires the SSID from the radio wave, and is connected to the wireless communication network corresponding to the acquired SSID.

In step S1503, the operation control unit 61 compares the wireless communication ID 205 retained by the electronic device 6 with the SSID acquired by the electronic device 6. If the wireless communication ID 205 retained by the electronic device 6 and the SSID acquired by the electronic device 6 match to each other, the process proceeds to step S1504. If the wireless communication ID 205 retained by the electronic device 6 and the SSID acquired by the electronic device 6 do not match to each other, the process proceeds to step S1507.

In step S1504, the operation control unit 61 transmits the unlock instruction of the access to the non-volatile memory 32 to the storage device 3B. For example, the unlock instruction may include the lock flag 207 indicating the unlocking.

The operation control unit 61 may return to step S1503 after step S1504. After step S1504, the storage device 3 performs step S1505.

In step S1505, the memory controller 33 of the storage device 3B receives the unlock instruction from the electronic device 6 via the connection unit 38, and performs the unlocking process. Specifically, the memory controller 33 sets the lock flag 207 stored in the non-volatile memory 32 to be off, as the unlocking process.

In step S1506, if the storage device 3B is detached from the attachment unit 62 of the electronic device 6, the supply of the power to the storage device 3B from the electronic device 6 is stopped, and the process proceeds to step S1507.

In step S1507, the operation control unit 61 transmits an instruction to lock the access to the non-volatile memory 32 to the storage device 3B. For example, the lock instruction may include the lock flag 207 being in the turn-on state.

In step S1508, the memory controller 33 of the storage device 3B receives the lock instruction from the electronic device 6 via the connection unit 38, and performs the locking process. Specifically, the memory controller 33 sets the lock flag 207 stored in the non-volatile memory 32 to be on, as the locking process.

In the present embodiment described above, the access to the wireless storage device 3A is unlocked only if the radio wave corresponding to the wireless communication ID 205 as an unlocking target is able to be received. In other words, only if the user brings the wireless storage device 3A in a specific area where the radio wave corresponding to a specific wireless communication ID 205 is able to be received, it is possible to read from the non-volatile memory 32 of the wireless storage device 3A.

Thus, for example, the user can lock or unlock the access to the non-volatile memory 32 of the wireless storage device 3A without performing a special operation such as a password input for the wireless storage device 3A, and the convenience of the user is improved. It is possible to prevent the user from forgetting to lock the access to the non-volatile memory 32 of the wireless storage device 3A, and it is possible to increase the security of the wireless storage device 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a connection unit to which one of a first external device having a first external device ID and a second external device having a second external device ID is to be connected;
   a first non-volatile memory in which content items are each stored with associated unique content IDs;
   a first controller configured to access the content items stored in the first non-volatile memory;
   an antenna;
   a second non-volatile memory in which permission information and permission factors for updating the permission information are stored, wherein the permission information includes a first permission information that associates a first permission flag with the first external device ID and at least one of the content IDs, and a second permission flag with the second external device ID and at least one of the content IDs; and
   a second controller configured to update the permission factors and, in response to a request from a third external device to read the permission factors, transmit the permission factors to the third external device, and then update the permission information stored in the second non-volatile memory based on update information which is generated by the third external device using the permission factors and received from the third external device through the antenna, wherein
   the request to read the permission factors and the update information are contained in radio waves transmitted by the third external device and the radio waves cause the antenna to generate power by electromagnetic induction, the generated power supplying power necessary to operate the second non-volatile memory and the second controller, and
   in response to a read command from the first external device having the first external device ID, the first controller performs a read of a first content item, which is one of the content items, if the first permission flag associated with the first content item indicates that the first content item is allowed to be read, and in response to a read command from the second external device having the second external device ID, the first controller performs a read of a second content item, which is one of the content items, if the second permission flag associated with the second content item indicates that the second content item is allowed to be read.

2. The device according to claim 1, wherein the read command from the first external device includes a content ID and the first controller performs a read of the content item corresponding to the content ID based on the updated permission information.

3. The device according to claim 2, wherein the first controller does not perform the read of the first content item in response to the read command from the first external device if the first permission flag indicates that the first content item is not allowed to be read, and does not perform the read of the second content item in response to the read command from the second external device if the second permission flag indicates that the second content item is not allowed to be read.

4. The device according to claim 1, further comprising:
   a third controller that processes the read command from the first external device and the read command from the second external device.

5. The device according to claim 4, wherein
   in response to a content list command from the first external device or the second external device via the connection unit, the third controller generates a list of content items for each of which the updated permission information indicates reading is permitted, and transmits the generated list to the first external device or the second external device.

6. The device according to claim 5, wherein the first non-volatile memory, the first controller, and the third controller are powered using power supplied by the first external device or the second external device through the connection unit, and each of the first non-volatile memory, the first controller, and the third controller is not operable using just the power generated by the antenna.

7. The device according to claim 4, wherein
   the third controller is built into the first controller.

8. The device according to claim 1, wherein the first permission information associates the first permission flag with the first external device ID and more than one of the content IDs.

9. The device according to claim 1, wherein the first permission information associates the first permission flag with the first external device ID and a first content ID, which is one of the content IDs, and the second permission information associates the second permission flag with the second external device ID and the first content ID.

10. The device according to claim 1, wherein the permission factors include:
    for each permission flag, a number of times the permission flag has been accessed by the third external device, a latest access of the permission flag by the third external device, and a location of the third external device during the latest access.

* * * * *